US010865787B2

(12) United States Patent
Bishop et al.

(10) Patent No.: US 10,865,787 B2
(45) Date of Patent: Dec. 15, 2020

(54) CONNECTED PUMP SYSTEM CONTROLLER AND METHOD OF USE

(71) Applicant: Pentair Flow Technologies, LLC, Delavan, WI (US)

(72) Inventors: Michael Bishop, Twin Lakes, WI (US); Hassan Khalid, Greenfield, WI (US)

(73) Assignee: Pentair Flow Technologies, LLC, Delavan, WI (US)

( * ) Notice: Subject to any disclaimer, the term of this patent is extended or adjusted under 35 U.S.C. 154(b) by 0 days.

(21) Appl. No.: 15/832,669

(22) Filed: Dec. 5, 2017

(65) Prior Publication Data

US 2018/0156211 A1 Jun. 7, 2018

Related U.S. Application Data

(60) Provisional application No. 62/430,748, filed on Dec. 6, 2016.

(51) Int. Cl.
*F04B 51/00* (2006.01)
*G05B 15/02* (2006.01)
(Continued)

(52) U.S. Cl.
CPC ............ *F04B 51/00* (2013.01); *F04B 49/065* (2013.01); *F04B 49/08* (2013.01); *G05B 15/02* (2013.01);
(Continued)

(58) Field of Classification Search
CPC ........ F04B 51/00; F04B 49/065; F04B 49/08; F04B 2205/06; G05B 15/02; H04W 76/15;
(Continued)

(56) References Cited

U.S. PATENT DOCUMENTS

| 5,100,298 A | 3/1992 | Shibata et al. |
| 5,494,573 A | 2/1996 | Schoenmeyr et al. |

(Continued)

FOREIGN PATENT DOCUMENTS

| CN | 204755329 U | 11/2015 |
| CN | 105673467 A | 6/2016 |

(Continued)

OTHER PUBLICATIONS

International Search Report and Written Opinion, International Application No. PCT/US2017/064770, dated Mar. 1, 2018, 17 pages.

*Primary Examiner* — Thomas C Lee
*Assistant Examiner* — Michael Tang
(74) *Attorney, Agent, or Firm* — Husch Blackwell LLP

(57) ABSTRACT

In some embodiments of the present disclosure, systems and methods for monitoring operation of a pump are provided. In some embodiments, a system comprises: a pressure switch, comprising: a PCB within a housing; a power supply; a wireless gateway module configured to establishes a wireless connection to a wireless network; a pressure sensor; a microcontroller that: establishes a second wireless connection to a mobile device; receives instructions from the mobile device; connect to the first wireless network based on the instructions; determine pressure; control operation of the pump based on the pressure; determine that a fault has occurred, automatically stop operation of the pump, and send a message to a server over the first wireless network; and receive instructions from the mobile device via the server and the first wireless network to change a setting of the pressure switch.

41 Claims, 15 Drawing Sheets

(51) Int. Cl.
  *F04B 49/06* (2006.01)
  *F04B 49/08* (2006.01)
  *G06Q 20/12* (2012.01)
  *H04W 84/18* (2009.01)
  *H04W 88/16* (2009.01)
  *G06Q 30/06* (2012.01)
  *H04W 76/15* (2018.01)

(52) U.S. Cl.
  CPC .......... *F04B 2205/06* (2013.01); *G06Q 20/12* (2013.01); *G06Q 30/0633* (2013.01); *H04W 76/15* (2018.02); *H04W 84/18* (2013.01); *H04W 88/16* (2013.01)

(58) Field of Classification Search
  CPC ...... H04W 84/18; H04W 88/16; G06Q 20/12; G06Q 30/0633
  See application file for complete search history.

(56) References Cited

U.S. PATENT DOCUMENTS

| | | | |
|---|---|---|---|
| 6,096,224 A | 8/2000 | Champie | |
| 6,553,336 B1 | 4/2003 | Johnson et al. | |
| 6,676,831 B2 | 1/2004 | Wolfe | |
| 6,725,813 B1 | 4/2004 | Boyer | |
| 6,992,590 B1 | 1/2006 | Tietsworth et al. | |
| 7,126,469 B2 | 10/2006 | Fish | |
| 7,292,898 B2 | 11/2007 | Clark et al. | |
| 7,307,538 B2 | 12/2007 | Kochan, Jr. | |
| 7,683,776 B2 | 3/2010 | Glenn et al. | |
| 7,758,315 B2 | 7/2010 | Moskun | |
| 7,776,209 B2 | 8/2010 | Duplessis et al. | |
| 7,874,808 B2 | 1/2011 | Stiles | |
| 7,983,877 B2 | 7/2011 | Koehl | |
| 8,341,002 B2 | 12/2012 | Han et al. | |
| 8,436,559 B2 | 5/2013 | Kidd et al. | |
| 8,760,302 B1* | 6/2014 | MacDonald | G01F 25/0061 340/602 |
| 9,058,027 B2 | 6/2015 | Macey | |
| 9,360,018 B2 | 6/2016 | Milthers et al. | |
| 9,435,325 B2 | 9/2016 | Boeing et al. | |
| 9,441,625 B2* | 9/2016 | Schoendorff | F04B 51/00 |
| 9,441,632 B2 | 9/2016 | Bishop et al. | |
| 9,494,480 B2 | 11/2016 | Klicpera | |
| 9,655,810 B2 | 5/2017 | Macey | |
| 9,749,792 B2* | 8/2017 | Klicpera | G06Q 50/06 |
| 10,316,849 B2 | 6/2019 | Munk et al. | |
| 2003/0172072 A1* | 9/2003 | Smith | G06Q 10/087 |
| 2004/0211210 A1 | 10/2004 | Crisp, III | |
| 2005/0123408 A1 | 6/2005 | Koehl | |
| 2006/0078435 A1 | 4/2006 | Burza | |
| 2006/0155610 A1* | 7/2006 | Neville | G06Q 30/06 705/27.1 |
| 2007/0103324 A1* | 5/2007 | Kosuge | E03F 7/00 340/618 |
| 2008/0028936 A1* | 2/2008 | Takahashi | B01D 47/14 96/25 |
| 2008/0039977 A1 | 2/2008 | Clark et al. | |
| 2010/0169030 A1* | 7/2010 | Parlos | G01H 1/00 702/58 |
| 2011/0061415 A1* | 3/2011 | Ward | F04B 49/04 62/291 |
| 2011/0311370 A1 | 12/2011 | Sloss et al. | |
| 2012/0213644 A1 | 8/2012 | Phillips et al. | |
| 2012/0325460 A1 | 12/2012 | Lisk | |
| 2013/0197700 A1 | 8/2013 | Kochan, Jr. et al. | |
| 2013/0211615 A1* | 8/2013 | Zikes | G06F 1/26 700/295 |
| 2013/0243614 A1* | 9/2013 | Moon | F17D 3/00 417/63 |
| 2014/0119947 A1 | 5/2014 | Bishop et al. | |
| 2014/0159859 A1* | 6/2014 | Karam | G08B 25/10 340/5.7 |
| 2014/0266788 A1 | 9/2014 | Bauckman et al. | |
| 2014/0379302 A1 | 12/2014 | Park | |
| 2015/0023183 A1* | 1/2015 | Ilsar | H04W 48/16 370/244 |
| 2015/0064021 A1 | 3/2015 | Laing | |
| 2015/0184924 A1* | 7/2015 | Vie | F25D 21/004 62/80 |
| 2015/0201370 A1* | 7/2015 | Desai | H04W 8/245 370/254 |
| 2015/0251102 A1* | 9/2015 | Kuo | A63F 13/215 463/35 |
| 2015/0322951 A1 | 11/2015 | Bishop et al. | |
| 2015/0378371 A1 | 12/2015 | Lange et al. | |
| 2015/0379856 A1 | 12/2015 | Glenn et al. | |
| 2016/0098037 A1 | 4/2016 | Zornio et al. | |
| 2016/0108607 A1 | 4/2016 | Weinstein | |
| 2016/0125895 A1* | 5/2016 | Gandhi | G10L 25/48 704/275 |
| 2016/0128114 A1* | 5/2016 | Moy | H04W 8/005 455/434 |
| 2016/0195864 A1 | 7/2016 | Kim | |
| 2016/0245272 A1 | 8/2016 | Bacha et al. | |
| 2016/0290668 A1* | 10/2016 | Taylor | F24F 11/30 |
| 2017/0226719 A1* | 8/2017 | Epp | E21B 43/121 |
| 2017/0300027 A1* | 10/2017 | Oyama | G07C 3/00 |
| 2018/0023826 A1* | 1/2018 | Tucker | F24F 11/62 700/276 |
| 2018/0302755 A1* | 10/2018 | He | H04W 4/06 |
| 2018/0347313 A1* | 12/2018 | Joseph | E21B 34/066 |

FOREIGN PATENT DOCUMENTS

| | | |
|---|---|---|
| CN | 205823599 U | 12/2016 |
| GB | 2465974 A | 9/2010 |
| WO | 2014066687 A2 | 5/2014 |
| WO | 2014124416 A1 | 8/2014 |
| WO | 2016087595 A1 | 6/2016 |

* cited by examiner

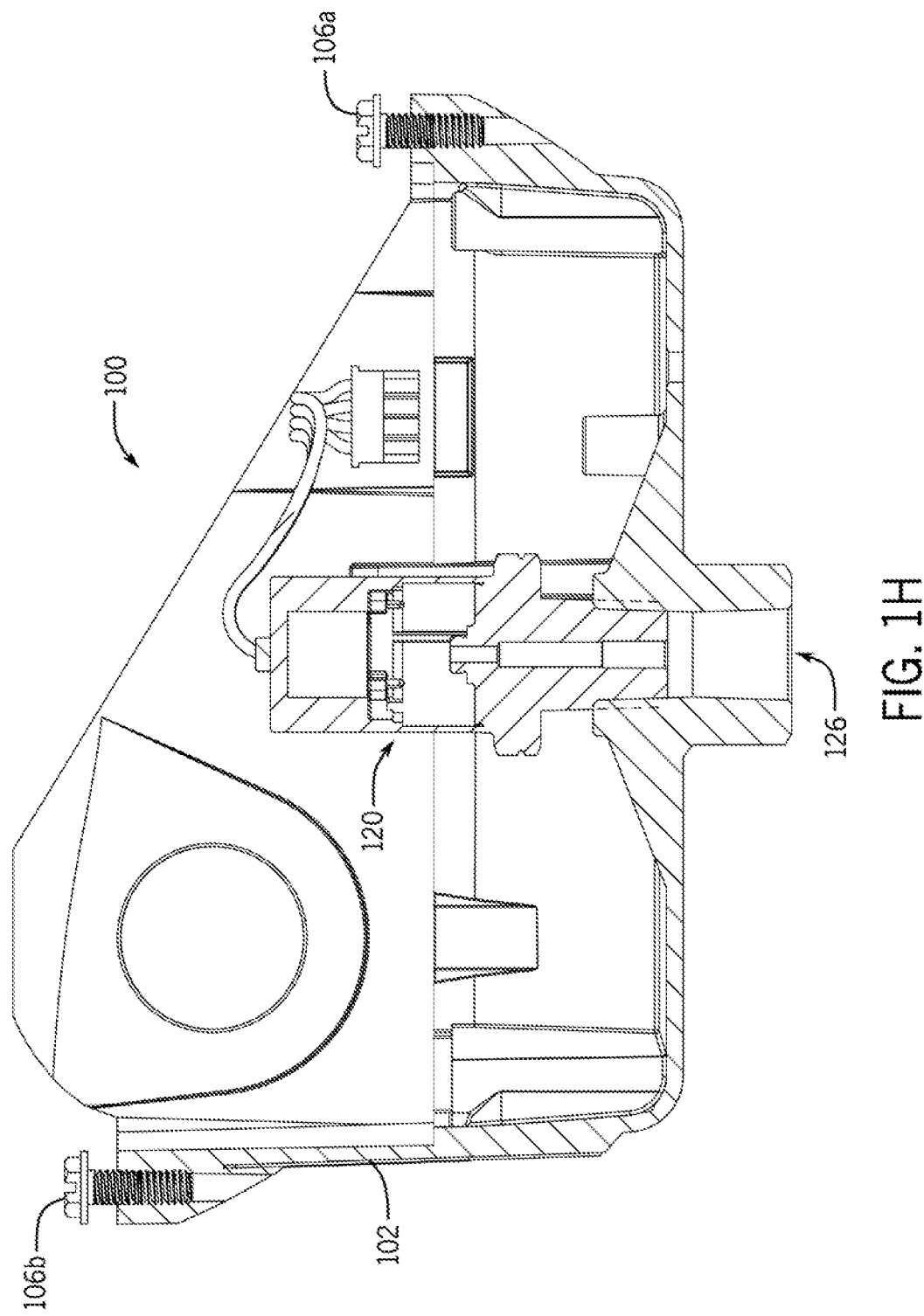

CONNECTED PUMP SYSTEM CONTROLLER AND METHOD OF USE

CROSS-REFERENCE TO RELATED APPLICATIONS

This application is based on, claims the benefit of, and claims priority to U.S. Provisional Application No. 62/430,748, filed Dec. 6, 2016, which is hereby incorporated herein by reference in its entirety for all purposes.

BACKGROUND

Some homes rely on well water as the primary water source. This can include drinking and cooking water, as well as water for showers, baths, toilets, and even heat. Thus, a loss of water can impact a number of residential systems. Homes that rely on well water often employ pump control systems to maintain adequate water pressure. For example, a homeowner may install a robust control system, such as an IntelliDrive® continuous water pressure system from Sta-Rite by Pentair. Such a robust system may be configured to automatically detect faults, and present information about the fault to the homeowner and/or a technician to assist in trouble shooting, and may even be capable of providing such information remotely. However, such systems are often costly and difficult to install.

Many homes may be equipped with less robust (and less costly) pump controllers, such as a pump that is controlled via a simple pressure switch that turns the pump on when the water pressure falls below a cut-in (or cut-on) pressure (e.g., 20 pounds per square inch (psi)) and turns the pump off when the pressure exceeds a cut-out (or cut-off) pressure (e.g., 40 psi). Such pressure switches may be adjustable via one or more adjustment nuts. For example, one nut may control the magnitude of the cut-in and cut-out pressure (e.g., this can be used to adjust the cut-in/cut-out pressures from 20/40 psi to 30/50 psi), and another nut may control the width of the range between the cut-in and cut-out pressure (e.g., this can be used to adjust the gap between cut-in and cut-out from 20 psi to 25 psi). Some pressure switches are also equipped with a mechanical low water cut-off that prevents the switch from providing power to the pump when there is not enough water available for pumping and/or when the water pressure is very low. When the low water cut-off is triggered, this typically causes a low water pressure and/or a loss of water availability throughout the home. Additionally, when the low water cut-off on such switches is triggered, there is no mechanism for alerting a homeowner or technician that the pump has been disabled. Rather, the fault is often only discovered when an occupant tries to use water (e.g., by turning on the faucet), and the pressure is significantly lower than expected or no water flows. If the homeowner is away when the water pumping system experiences a fault, such as loss of power, loss of flow, loss of pressure, etc., some robust pump control systems may not be configured to alert the homeowner remotely, and typical pressure switches are completely incapable of alerting the user to a fault, as they are simple electromechanical devices. A delay in the homeowner being notified about a fault in the pumping system can result in other systems in the home being compromised, such as a hot water heater, a sprinkler system, a boiler, etc., that relies on the availability of water. Simple pressure switches are also incapable of notifying a homeowner or technician about why a fault occurred. For example, whether the fault is due to low water pressure, damage or wear in the pressure switch, damage or wear in the pump, a fault in the power supply (e.g., in the homes electrical grid), the wiring between the switch and pump, or other points of potential failure, the result is generally the same, a loss of water pressure.

Accordingly, new systems and methods for providing individuals with the ability to monitor and control the status of a pressure switch, and in particular, to overcome the shortcomings relating to the troubleshooting of the pressure switch and the notification of individuals when a problem occurs are desirable.

SUMMARY

In accordance with some embodiments of the present disclosure, systems and methods for monitoring operation of a water pump coupled to plumbing are provided.

In accordance with some embodiments of the present disclosure a system for monitoring operation of a water pump coupled to plumbing is provided, the system comprising: a pressure switch, comprising: a printed circuit board, the printed circuit board positioned within a housing; a power supply in electrical communication with one or more components coupled to the printed circuit board, wherein the power supply is configured to receive electric power from one or more electric power inputs; a wireless gateway module coupled to the printed circuit board, wherein the wireless gateway module is configured to establish a first wireless connection to a first wireless network, and transmit a message to a remote server over the first wireless network; a pressure sensor; a microcontroller coupled to the wireless gateway module, the printed circuit board, the power supply, and the pressure sensor, wherein the microcontroller is configured to execute computer readable instructions, wherein execution of the computer readable instructions cause the microcontroller to: establish a second wireless connection to communicate with an internet enabled device over a second wireless network; receive one or more instructions from the internet enabled device over the second wireless connection; configure the pressure switch to connect to the first wireless network based on the one or more instructions; receive a signal from the pressure sensor indicative of pressure in at least a portion of the plumbing; determine the pressure in at least the portion of the plumbing based on the signal from the pressure sensor; control operation of the water pump based on the pressure; determine that a fault has occurred in the system; in response to determining that the fault has occurred in the system, automatically inhibiting operation of the pump without user intervention; generate the message, wherein the message includes information related to the fault; establish a connection to the first wireless network; and send the message to the remote server via the first wireless network; and the remote server, wherein the remote server is configured to: receive the message; store the received message in a file structure associated with the pressure switch; receive a request from the internet enabled device to access information related to the fault; and send the information related to the fault to the internet enabled device.

In some embodiments, the pressure switch is mounted to the pump.

In some embodiments, the pressure switch is configured to receive a signal indicative of a motor current of the pump.

In some embodiments, execution of the computer readable instructions further cause the microcontroller to: determine that a first fault occurred based on the motor current; and determine that a second fault occurred based on the signal output from the pressure sensor.

In some embodiments, the housing comprises a base and a cover, the cover comprising at least one through-hole and the base comprising at least one recess.

In some embodiments, the cover is configured to be securely coupled to the base by a coupling element passing through the at least one through hole and into the at least one recess.

In some embodiments, the pressure switch further comprises a relay electrically connected between the one or more electric power inputs and the water pump, and wherein execution of the computer readable instructions further cause the microcontroller to: cause the relay to complete a circuit between the one or more electric power inputs and the water pump in response to pressure in at least the portion of the plumbing being less than a cut-in pressure; and cause the relay to interrupt the circuit between the one or more electric power inputs and the water pump in response to pressure in at least the portion of the plumbing being greater than a cut-out pressure.

In some embodiments, the pressure sensor is a pressure transducer.

In some embodiments, the internet enabled device is a mobile computing device.

In some embodiments, the power supply is a switched-mode power supply.

In some embodiments, the wireless gateway module is configured to communicate directly with the internet enabled device.

In some embodiments, the second wireless connection is a Wi-Fi connection, and wherein execution of the computer readable instructions further cause the microcontroller to: configure the wireless gateway module to function as a discoverable node for a peer-to-peer Wi-Fi connection for a predetermined time in response to the microcontroller transitioning from an off state to an on state; receive a request to connect to the node from the internet enabled device; and in response to the request to connection to the node, establish the second wireless connection with the internet enabled device.

In some embodiments, the first wireless connection is a Wi-Fi connection, and wherein the wireless gateway module is configured to communicate with a wireless access point in a local area network (LAN) to establish the first wireless connection.

In some embodiments, execution of the computer readable instructions further cause the microcontroller to: receive the one or more instructions from an application executed by the internet enabled device over the second wireless connection, wherein the one or more instructions includes an instruction indicating a service set identifier (SSID) associated with the wireless access point in the LAN; and configure the pressure switch to connect to the first wireless network based on the SSID.

In some embodiments, execution of the computer readable instructions further cause the microcontroller to receive a command corresponding to a selection made via a user interface presented by the internet enabled device.

In some embodiments, the command includes at least one instruction to cause the pressure switch to change at least one of a plurality of device settings.

In some embodiments, the wireless gateway module is configured to receive the command over the first wireless connection.

In some embodiments, execution of the computer readable instructions further cause the microcontroller to change the at least one of the plurality of device settings based on the command.

In some embodiments, the remote server is a cloud-based server.

In some embodiments, execution of the computer readable instructions further cause the microcontroller to: generate a second message, wherein the second message includes information related to a status of the system; and send the second message to the remote server via the first wireless network.

In some embodiments, execution of the computer readable instructions further cause the microcontroller to: generate a second message, wherein the second message includes information related to a change in a status of the system; and send the second message to the remote server via the first wireless network.

In some embodiments, execution of the computer readable instructions further cause the microcontroller to: generate a second message, wherein the second message includes information indicating that the system requires maintenance; and send the second message to the remote server via the first wireless network.

In some embodiments, execution of the computer readable instructions further cause the microcontroller to: generate a second message, wherein the second message includes a request for maintenance; and send the second message to the remote server via the first wireless network.

In some embodiments, the remote server is further configured to send a request for maintenance based on the second message to a service provider automatically without user intervention in response to receive the second message.

In some embodiments, execution of the computer readable instructions further cause the microcontroller to: generate a second message, wherein the second message includes a request for replacement parts; and send the second message to the remote server via the first wireless network.

In some embodiments, the remote server is further configured to send a request for replacement parts to a parts supplier automatically without user intervention in response to receive the second message.

In some embodiments, the remote server is further configured to send payment information with the request for replacement parts.

In some embodiments, the pressure switch is configured for use with at least one of a sump pump controller, a residential water pump controller, a pool pump controller, and an automated pool controller.

In some embodiments, the second wireless connection is a cellular connection, and the wireless gateway is further configured to communicate with the remote server using the cellular connection.

In some embodiments, the message includes information related to energy efficiency of the water pump.

In some embodiments, the pressure switch further comprises a temperature sensor, and wherein the message includes information related to an ambient temperature in the vicinity of the pressure switch based on an output of the temperature sensor.

In some embodiments, the message include information related to water leak detection.

In some embodiments, the message includes information related to a water flow rate.

In some embodiments, the message includes information related to managing energy use of the water pump with respect to energy grid capacity.

In some embodiments, the message includes water quality parameters.

In some embodiments, the fault corresponds to a low water condition, and wherein execution of the computer readable instructions further cause the microcontroller to interrupt power to the water pump in response to the fault.

In some embodiments, execution of the computer readable instructions further cause the microcontroller to implement a short cycle protection delay.

In some embodiments, the fault corresponds to an overcurrent condition, and wherein execution of the computer readable instructions further cause the microcontroller to interrupt power to the water pump in response to the fault.

In some embodiments, the fault corresponds to an overpressure condition, wherein execution of the computer readable instructions further cause the microcontroller to interrupt power to the water pump in response to the fault.

In some embodiments, the remote server is further configured to store up to 50 occurrences of fault conditions.

In some embodiments, the remote server is further configured to store an installation record for the pressure switch, the installation record comprising at least one of a pump size, a pump type, a pump setting, a casing depth, a well depth, a check valve location, a drawdown, and a pressure switch serial number.

In accordance with some embodiments of the present disclosure, a method for controlling and monitoring a water pump coupled to plumbing is provided, the method comprising: disconnecting a first pressure switch from the water pump and the plumbing; connecting a second pressure switch to the water pump and the plumbing, wherein the second pressure switch comprises: a printed circuit board, the printed circuit board positioned within a housing; a power supply in electrical communication with one or more components coupled to the printed circuit board; a wireless gateway module coupled to the printed circuit board, wherein the wireless gateway module is configured to establish a wireless connection to a first wireless network, and transmit a message to a remote server over the first wireless network; a pressure sensor; a microcontroller coupled to the wireless gateway module, the printed circuit board, the power supply, and the pressure sensor; establishing, using an internet enabled device, a second wireless connection to communicate with the pressure switch over a second wireless network; causing the internet enabled device to send one or more instructions that cause the pressure switch to connect to the first wireless network; receiving, using the internet enabled device, a message from a remote server, wherein the message includes information related to a fault that occurred in at least one or the pressure switch and the water pump, and information indicating that further operation of the water pump is inhibited until the fault is addressed.

DESCRIPTION OF THE DRAWINGS

The invention will be better understood and features, aspects and advantages other than those set forth above will become apparent when consideration is given to the following detailed description thereof. Such detailed description makes reference to the following drawings.

FIG. 1H is a cutaway side view of the pressure switch of FIG. 1A.

FIG. 1I is another top perspective view of the interior of the pressure switch of FIG. 1A.

DETAILED DESCRIPTION

Figure 1A:
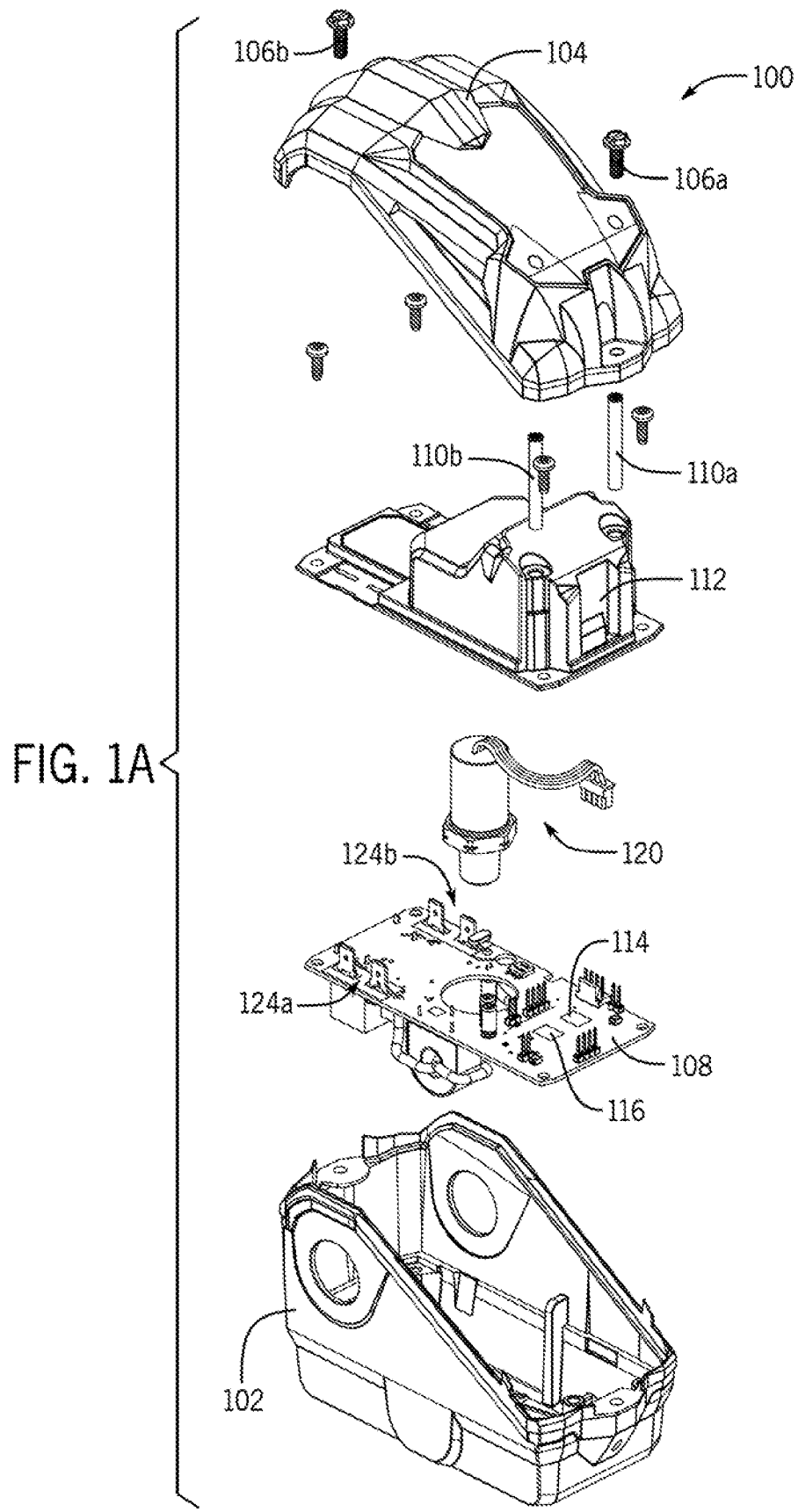
FIG. 1A is an exploded view of a pressure switch in accordance with some embodiments of the present disclosure.
Figure 1B:
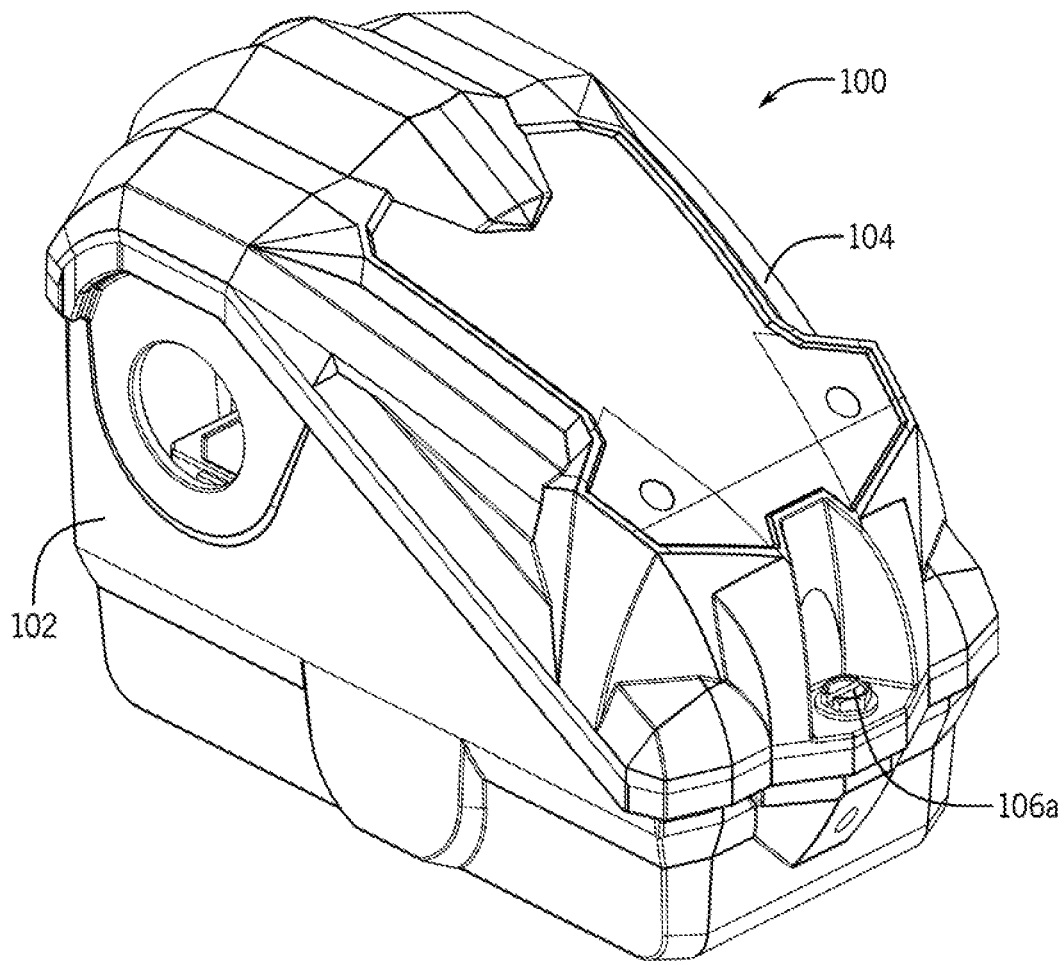
FIG. 1B is a top perspective view of the pressure switch of FIG. 1A
Figure 1C:
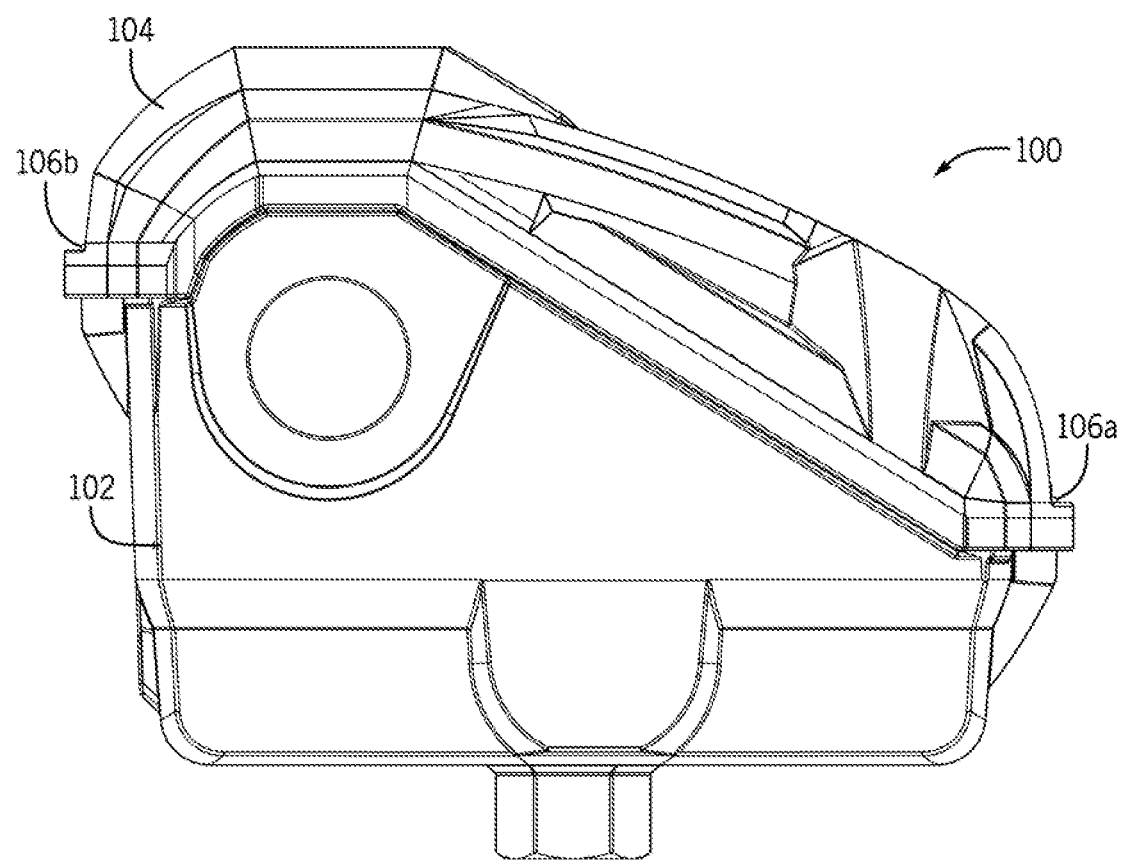
FIG. 1C is a right side view of the pressure switch of FIG. 1A.
Figure 1D:
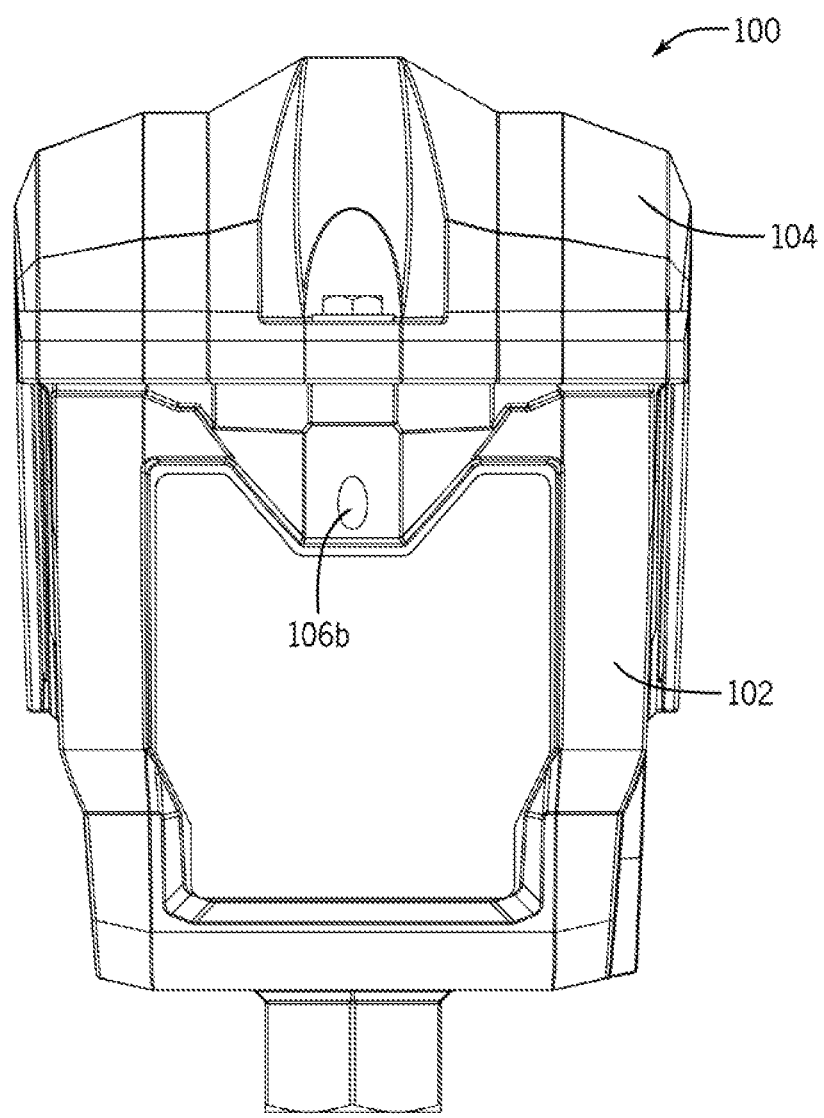
FIG. 1D is a rear view of the pressure switch of FIG. 1A.
Figure 1E:
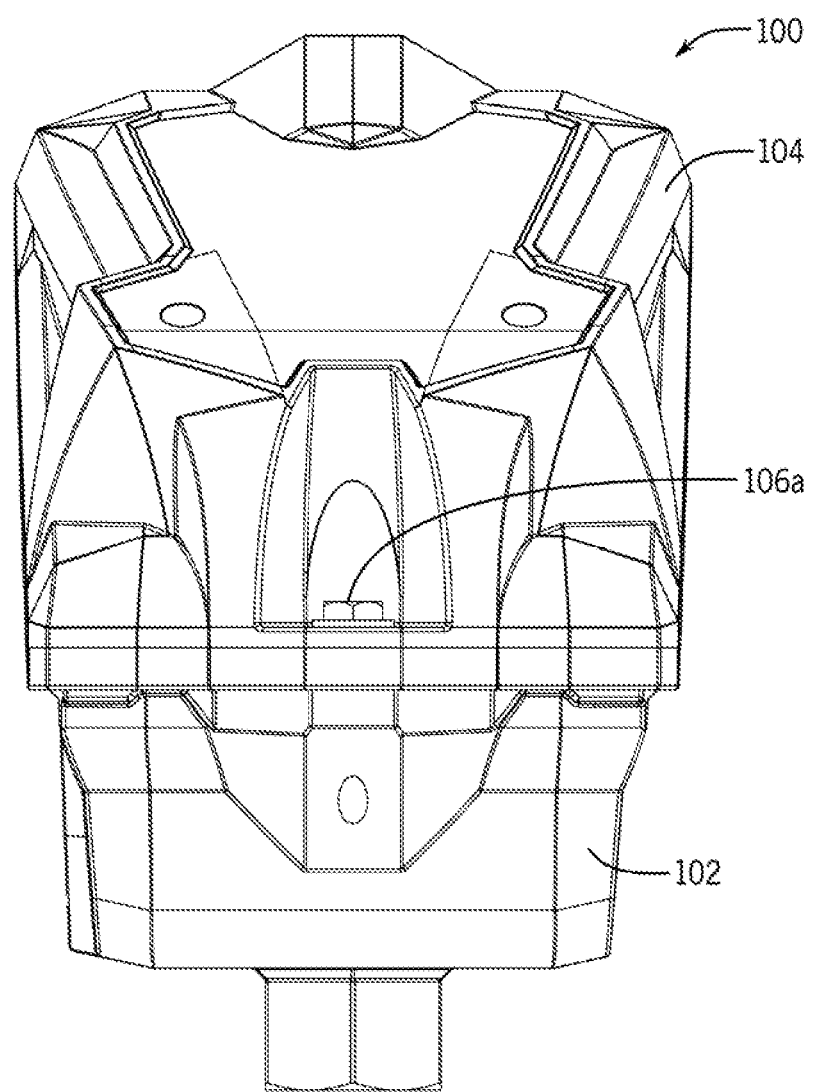
FIG. 1E is a front view of the pressure switch of FIG. 1A.
Figure 1F:
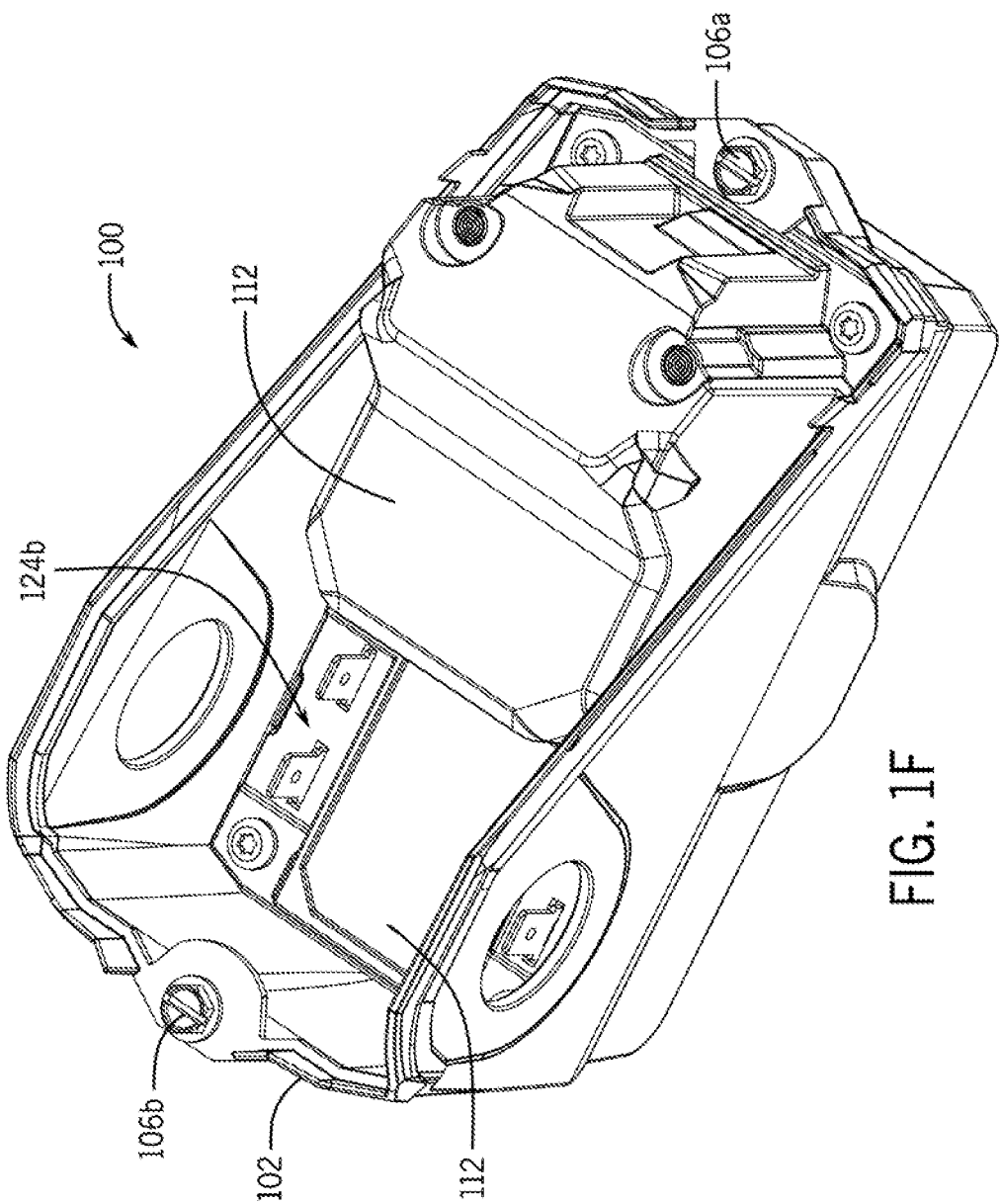
FIG. 1F is a top perspective view of the interior of the pressure switch of FIG. 1A.
Figure 1G:
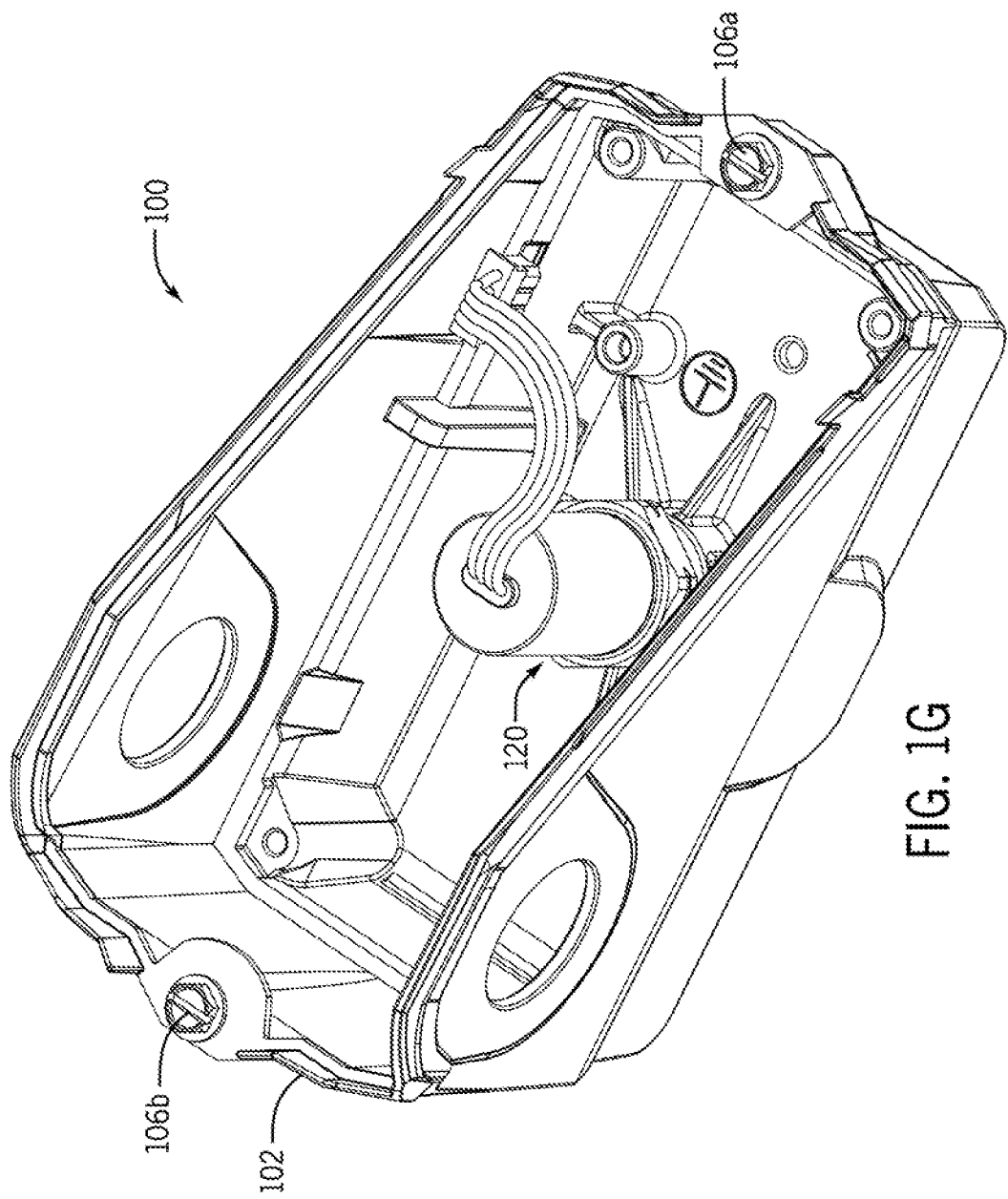
FIG. 1G is another top perspective view of the interior of the pressure switch of FIG. 1A.
Figure 11:
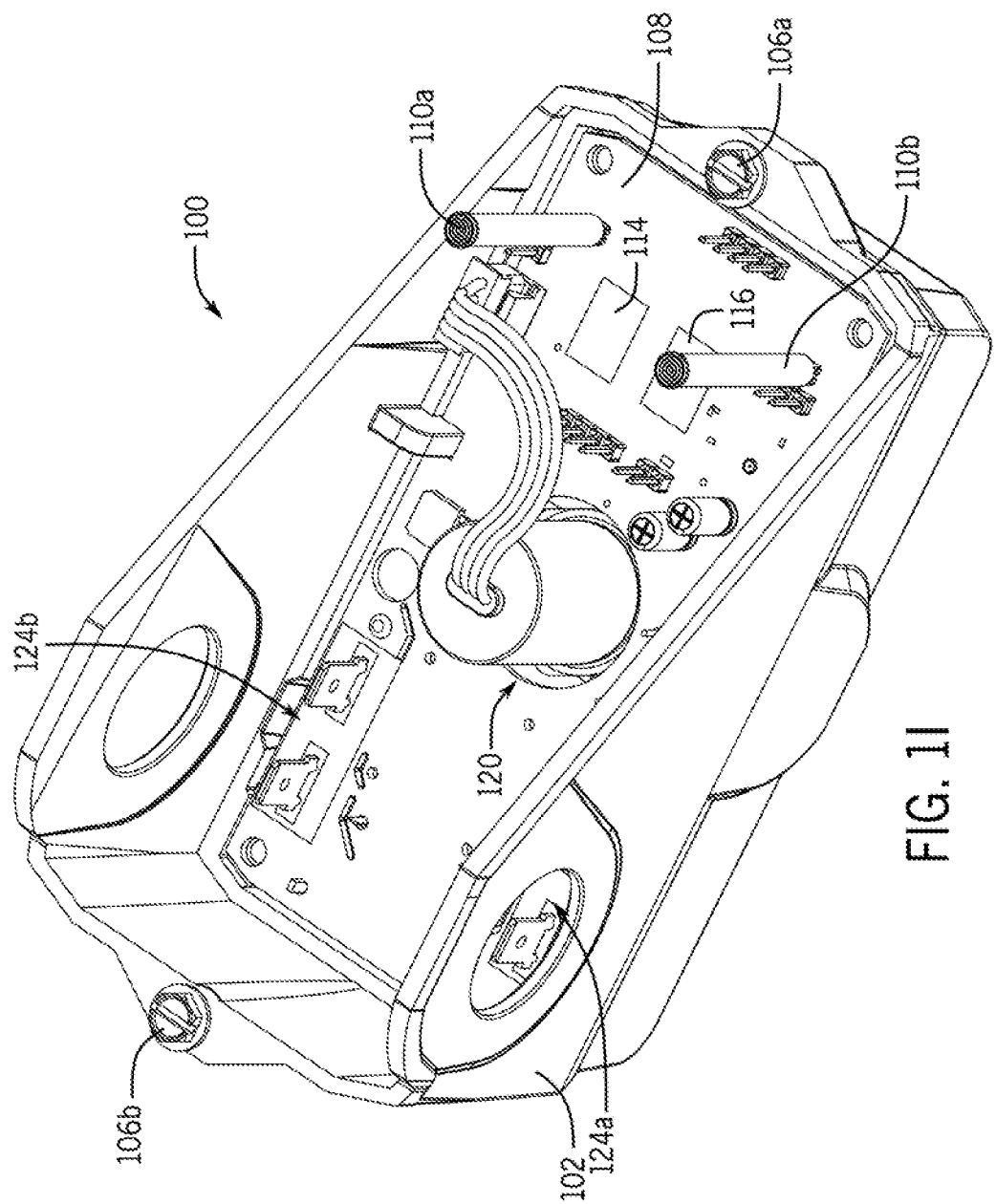

Before any embodiments are described in detail, it is to be understood that the invention is not limited in its application to the details of construction and the arrangement of components set forth in the following description or illustrated in the following drawings, which is limited only by the claims that follow the present disclosure. The invention is capable of other embodiments, and of being practiced, or of being carried out, in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following description is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. Skilled artisans will recognize the examples provided herein have many useful alternatives and fall within the scope of embodiments of the invention.

Additionally, while the following discussion may describe features associated with specific devices, it is understood that additional devices and or features can be used with the described systems and methods, and that the discussed devices and features are used to provide examples of possible embodiments, without being limited.

FIG. 1A shows an example of an exploded view of a pressure switch 100 in accordance with some embodiments of the present disclosure. In some embodiments, a base 102 can be configured to support and contain a printed circuit board (PCB) 108. In some embodiments, The PCB 108 can be electrically coupled to a microcontroller 114 and a wireless gateway module 116. Alternatively, in some embodiments, the microcontroller 114 can include a wireless gateway module, and the wireless gateway module 116 can be omitted. In some embodiments, spacers 110a, 110b can be affixed to the PCB 108 and an inner frame 112. The spacers 110a, 110b can aid in the protection of the PCB 108 and associated components. In some embodiments, the inner frame 112 can be in contact with a cover 104. In some embodiments, the cover 104 can be coupled to the base 102 via coupling elements 106a and/or 106b. In some embodiments, the inner frame 112 can also be coupled to the PCB 108. In some embodiments, the pressure switch 100 can include a pressure transducer within a transducer housing 120 that outputs a pressure signal that is provided to the microcontroller 114. In some embodiments, the pressure switch can include a relay that can control power to a pump based on control signals from the microcontroller 114. In some embodiments, terminals on the relay 122 can be electrically connected to posts 124a, 124b, which can be configured to be electrically connected to a source of power (e.g., a household electrical grid) and the pump, respectively. For example, posts 124a can be connected to wires and/or a cable carrying 230 volts alternating current (V AC), and posts 124b can be connected to wires and/or a cable that provides an electrical connection between the relay 122 and the pump. Note that although pressure switch 100 is described as including the microcontroller 114, this is merely an example, and any suitable type of hardware processor or combination of hardware processors can be used to monitor and/or control the pressure switch 100.

FIGS. 1B to 1E show example views of the outside of the pressure switch 100 in accordance with some embodiments of the present disclosure. In some embodiments, the pressure switch 100 can have a housing that can include the base 102 and the cover 104. In some embodiments, the base 102 can be coupled to the cover 104 via coupling elements 106a and/or 106b. In some embodiments, removal of the coupling elements 106a and/or 106b can allow access to the interior of the pressure switch 100 through the removal of the cover 104, which may facilitate routine maintenance. Additionally, in some embodiments, this can provide easy access to the interior components of the pressure switch 100 should replacement of any part(s) be necessary. In some embodiments, the housing of the pressure switch 100 can have one or more openings that allow access to the interior of the pressure switch 100. Alternatively, in some embodiments, the pressure switch 100 can be sealed. For example, it may be beneficial for the housing to be compliant with the NEMA 3 or 3R standards, as defined by the National Electrical Manufacturers Association (NEMA).

Figure 1J:
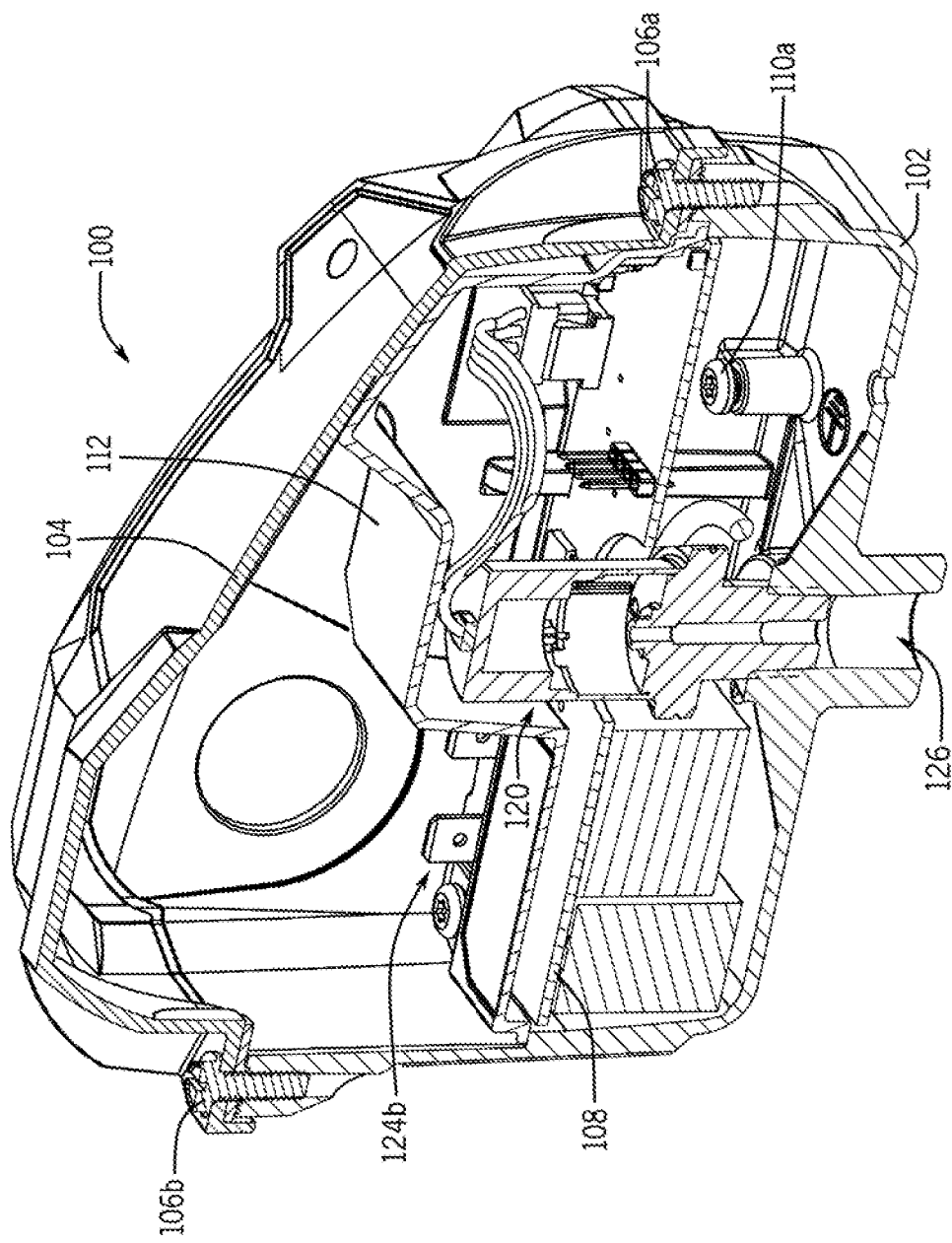
FIG. 1J is another cut away side view of the pressure switch of FIG. 1A.

FIGS. 1F-1J show views of various portions of the inside of the pressure switch 100 in accordance with some embodiments of the present disclosure. In some embodiments, the base 102 of the pressure switch 100 is shown. The coupling elements 106a, 106b allow the base 102 to coupled to the cover 104. The inner frame 112 can cover the PCB 108 when pressure switch 100 is assembled. The spacers 110a, 110b can be affixed to the PCB 108. The spacers 110a, 110b can, for example, protect individual components that are coupled to the PCB 108 by inhibiting the inner frame 112 from contacting the individual components. Although shown with particular dimensions, these are merely an example, and the PCB 108 can be configured to be different shapes and sizes, and can include a plurality of through-holes. The PCB 108 can be electrically coupled to the microcontroller 114. The PCB 108 can also be electrically coupled to the wireless gateway module 116. As described above, the wireless gateway module 116 can be part of, or separate from, the microcontroller 114. In some embodiments, for example, as shown in FIGS. 1H and 1J, an inlet 126 in the base 102 can be configured to be coupled to a plumbing system (e.g., including one or more pipes, tubes, valves, etc.) that is in fluid communication with a water supply (e.g., a well). In some such embodiments, the transducer can measure the water pressure in the plumbing system.

In some embodiments, the wireless gateway module 116 can be configured to send and receive data from a remote computing device (e.g., a server, a mobile device, etc.). In some embodiments, the wireless gateway module 116 can communicate with the remote computing device using a router and/or modem that provides a connection between a local area network (LAN) to which the wireless gateway module is connected and a wide area network (WAN), such as the Internet. For example, the wireless remote gateway module 116 can be configured to connect to a wireless LAN (e.g., a Wi-Fi network) via a wireless router, and the router can be connected to a WAN via a modem. Additionally or alternatively, in some embodiments, the wireless gateway module 116 can be configured to act as a modem that is capable of providing a connection to a WAN without connecting first to a LAN. For example, the wireless gateway module 116 can be configured to act as a cellular modem that can communicate over a cellular network (e.g., a 3G network, a 4G network, etc., complying with any suitable standard, such as CDMA, GSM, LTE, LTE Advanced, WiMAX, etc.), which can provide access to the Internet. In such an example, the wireless gateway module 116 can communicate with a remote computing device (e.g., a server, a mobile device, etc.) without being connected to a LAN.

In some embodiments, the pressure switch 100 can be configured to have a shape and size that allows the pressure switch 100 to replace an existing pressure switch. In some embodiments, by using a similar footprint to the existing pressure switch, the pressure switch 100 can be easily and quickly installed with out requiring modifications. For example, a pump that is controlled by a pressure switch that is adjustable via two adjustment nuts (sometimes referred to herein as a legacy pressure switch), can be reconfigured to be controlled by the pressure switch 100. In such an example, the legacy pressure switch can be removed (e.g., by interrupting power to the legacy pressure switch via a circuit breaker, disconnecting the wires and/or cable providing power to the legacy pressure switch, disconnecting the wires and/or cable providing power from the legacy pressure switch to the pump, and disconnecting the legacy pressure switch from the plumbing). After removing the legacy pressure switch, the pressure switch 100 can be installed in its place (e.g., by connecting the wires and/or cable from the power supply to posts 124a, connecting the wires and/or cable providing power from the pressure switch 100 to the pump to posts 124b, connecting the pressure switch 100 to the plumbing via inlet 126, and reconnecting power from the power supply to the pressure switch 100 through the circuit breaker). Although the base 102 and the cover 104 shown in FIGS. 1A to 1J as having particular shapes, these are merely examples, and the base 102 and the cover 104 can be configured to be different shapes and/or sizes.

Figure 2:
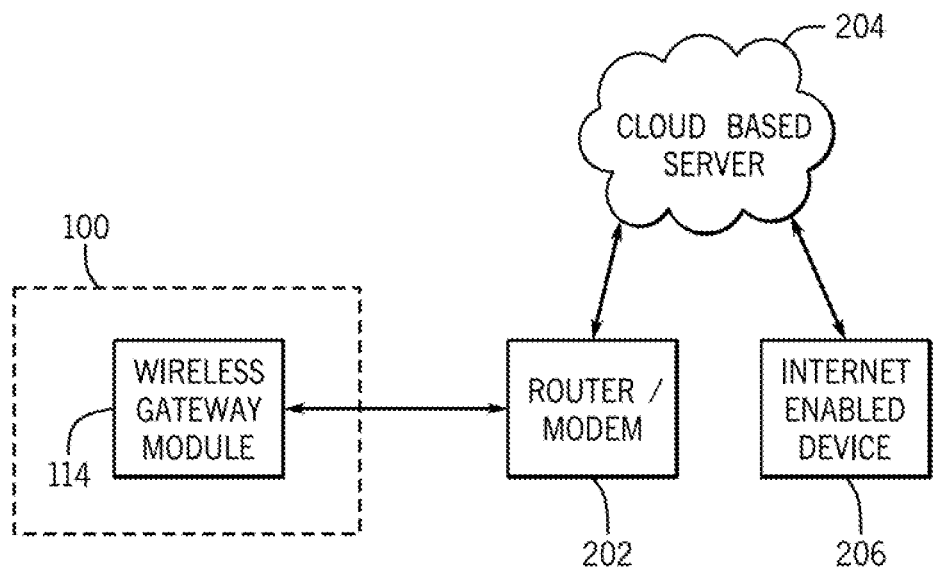
FIG. 2 is a communication block diagram in accordance with some embodiments of the present disclosure.

FIG. 2 illustrates an example of a wireless monitoring and control system for communicating information to and/or from pressure switch 100 to an internet enabled device in accordance with some embodiments of the present disclosure. In some embodiments, the wireless gateway module 116 can be positioned within the pressure switch 100 (e.g., as described above in connection with FIGS. 1A to 1J). In some embodiments, the wireless gateway module 116 can communicate with a router/modem 202, which can communicate with a cloud based server 204. In some embodiments, router/modem 202 can include any suitable combination of networking devices (e.g., one or more wireless routers, one or more wired routers, one or more Ethernet switches, one or more cable modems, one or more cellular modems, one or more optical network terminals, etc.). Additionally or alternatively, router/modem 202 can include one or more combined devices, such as a combined wireless router and cable modem. In some embodiments, the router/modem 202 can include a standard, off-the-shelf router and/or modem used for connecting to the Internet via an internet service provider (ISP). In some embodiments, the cloud based server 204 can communicate with an internet enabled device 206 using any suitable network or combination of networks. In some embodiments, the internet enabled device 206 can be any suitable computing device that can communicate with the cloud based server 204 via any suitable network or combination of networks. For example, the internet enabled device 206 can be a smartphone, a tablet computer, a wearable computer, a laptop computer, a personal computer, a server computer, a virtual machine being executed by a physical computing device, a virtual personal assistant, a device providing access to a virtual personal assistant (e.g., a smart speaker), etc. In some embodiments, the internet enabled device 206 can communicate with cloud based server 206 via a LAN (e.g., via a router/modem, such as router/modem 202, or a different router/modem that is located remotely from router/modem 202 and is part of a different local area network). In some embodiments, the pressure switch 100 can send and receive information (e.g., messages) to and from the internet enabled device 206 via the cloud based server 204. In some embodiments, the cloud based server 204 can store data received from, or directed to, the pressure switch 100 for later access (e.g., by the pressure switch 100 and/or by the internet enabled device 206). Note that in some embodiments, the pressure switch 100 can connect to the router/modem 204 via another device, such as a hub that coordinates communications between connected devices (e.g., Internet of things devices) and the router. For example, such a hub can connect to one or more connected devices via a ZigBee connection, and can receive messages over a ZigBee mesh network from the pressure switch 100 and relay the content of the message to the router in a format that is suitable for transmission over the Internet (e.g., a message formatted in compliance with TCP/IP).

In some embodiments, communications to and/or from the pressure switch 100, the router/modem 202, the cloud based server 204, and/or the internet enabled device 206 can be sent over a communication network, which can be any suitable communication network or combination of communication networks. For example, the communication network can include a Wi-Fi network (e.g., an 802.11x network, which can include one or more wireless routers, one or more switches, etc.), a peer-to-peer network (e.g., a Bluetooth network, a ZigBee® network, a Z-Wave® network, a proprietary RF connection, etc.), a cellular network (e.g., a 3G network, a 4G network, etc., complying with any suitable standard, such as CDMA, GSM, LTE, LTE Advanced, WiMAX, etc.), a wired network, an EnOcean® network, etc. In some embodiments, the communication network can be a LAN, a WAN, a public network (e.g., the Internet), a private or semi-private network (e.g., a corporate or university intranet), any other suitable type of network, or any suitable combination of networks. Communications links between the pressure switch 100, the router/modem 202, the cloud based server 204, and/or the internet enabled device 206 can each be any suitable communications link or combination of communications links, such as wired links, fiber optic links, Wi-Fi links, Bluetooth links, cellular links, etc.

Figure 3:
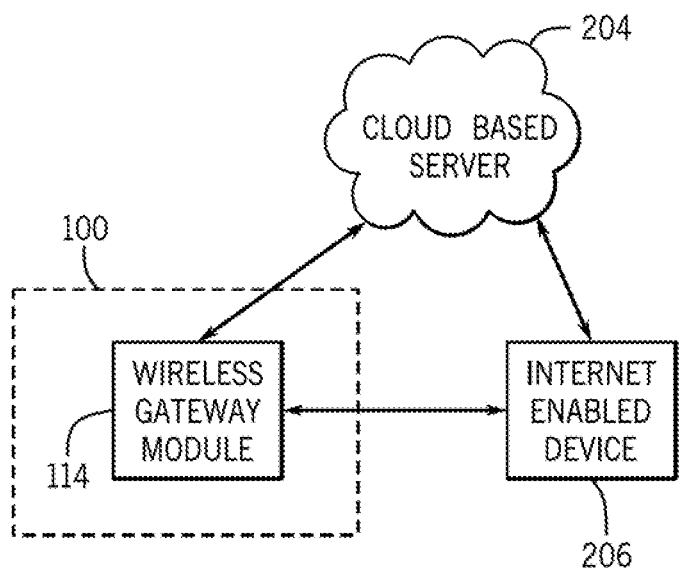
FIG. 3 is another communication block diagram in accordance with some embodiments of the present disclosure.

FIG. 3 illustrates another example of a wireless monitoring and control system for communicating information to and/or from pressure switch 100 to an internet enabled device in accordance with some embodiments of the present disclosure. In some embodiments, the wireless gateway module 116 can be positioned within the pressure switch 100, and can communicate with cloud based server 204 without the user of the router/modem 202. For example, in some embodiments, the wireless gateway module 116 can be configured to act as a cellular modem. Additionally or alternatively, in some embodiments, the wireless gateway module 116 can communicate with the internet enabled device 206 directly (e.g., via a peer to peer connection such as a Bluetooth connection, a ZigBee Connection, a Z-Wave connection, a Wi-Fi connection in which the wireless gateway module and/or the internet enabled device acts as a discoverable node such as an ad hoc Wi-Fi connection or a Wi-Fi Direct connection, etc.) and/or indirectly (e.g., using a LAN, a WAN, the Internet, a combination of networks, using a mesh network such as a mesh Wi-Fi network, a mesh ZigBee network, a mesh Z-Wave network, etc.). As described above in connection with FIG. 2, the internet enabled device 206 can communicate with the cloud based server 204 via any suitable network or combination of networks. In some embodiments, the pressure switch 100 can send and receive information (e.g., messages) to and from the internet enabled device 206 via the cloud based server 204 or via a peer connection or mesh network.

In some embodiments, the cloud based server 204 can store the received data in a location associated with the pressure switch 100 (e.g., in a particular table, in connection with a particular address, etc.). Additionally or alternatively, the cloud based server 204 can store the data in a location associated with a particular user account associated with the pressure switch 100. In some embodiments, the cloud based server 204 can store any suitable number of records, such as a particular number of most recent pressure readings (e.g., 50, 100, 1,000, etc.), pressure for a particular recent time period (e.g., over the last day, week, month, year, etc.), a particular number recent faults that have occurred (e.g., twenty, 50, 100, etc.). Note that although cloud based server 204 is described herein as being a cloud server, this is merely an example, and actions described as being performed by cloud based server 204 can be performed by a physical server that is under control of a service provider associated with the pressure switch 100. Note that the configurations shown in FIGS. 2 and 3 are not mutually exclusive, as the wireless gateway module 116 can be configured to communicate both via a LAN and via a cellular modem. In some embodiments, it may be beneficial to use a service, such as a software-as-a-service platform provided by Arrayent® (of Redwood City, Calif.) to provide firmware, software, and/or hardware (e.g., one or more servers) for facilitating communication between the pressure switch 100 and the internet enabled device.

In some embodiments, as described below in connection with FIG. 6, a user can create a user account by accessing the cloud based server 204 from the internet enabled device 206, and can associate with the pressure switch 100 with the account. In some embodiments, the pressure switch 100 can provide status information to the cloud based server 204, and the user can access information associated with the user account from any suitable internet abled device 206, which may or may not be the same internet abled device 206 that was used to create the account.

Figure 4A:
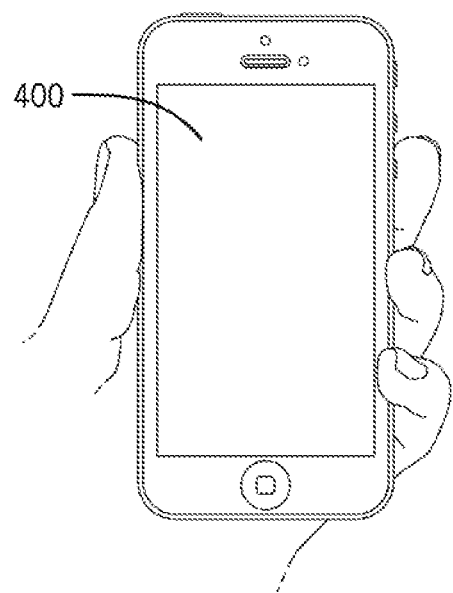
FIG. 4A is an example of an internet enabled device in accordance with some embodiments of the present disclosure.

FIG. 4A shows an example 400 of an internet enabled device in accordance with some embodiments of the present disclosure. As shown in FIG. 4A, the internet enabled device can be a smartphone. In some embodiments, a user can install an application on the smartphone 400 allowing the user to access information associated with the user account administered by the cloud based server 204. Additionally or alternatively, in some embodiments, a user can use an internet browser installed on smartphone 400 to access a web page through which the user can to access information associated with the user account administered by the cloud based server 204.

Figure 4B:
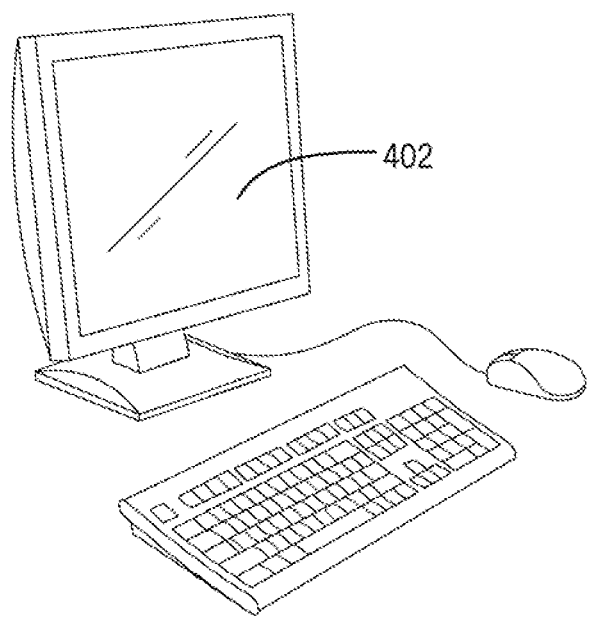
FIG. 4B is an example of another internet enabled device in accordance with some embodiments of the present disclosure.

FIG. 4B shows another example 402 of an internet enabled device in accordance with some embodiments of the present disclosure. As shown in FIG. 4B, the internet enabled device can be a personal computer 402 that is connected to the Internet. In some embodiments, a user can install an application on the personal computer 400 allowing the user to access information associated with the user account administered by the cloud based server 204. Additionally or alternatively, in some embodiments, a user can use an internet browser installed on personal computer 400 to access a web page through which the user can to access information associated with the user account administered by the cloud based server 204.

Figure 5:
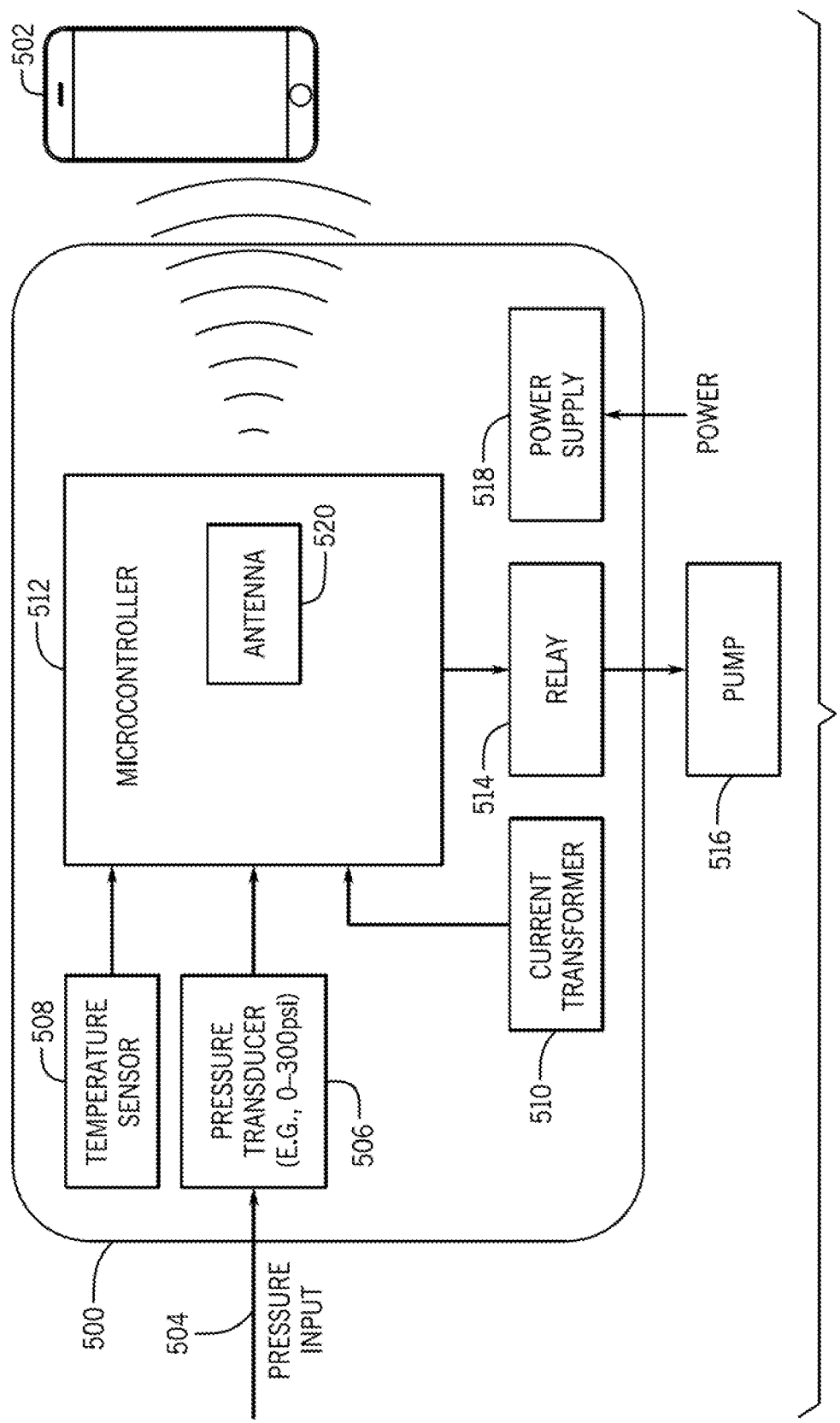
FIG. 5 is a block diagram in accordance with some embodiments of the present disclosure.

FIG. 5 shows an example of a block diagram of a system including a pressure switch 500 in accordance with some embodiments of the present disclosure. As shown in FIG. 5, the pressure switch 500 can include a pressure input 504, which can be in fluid communication with a pressure transducer 506. In some embodiments, pressure input 504 can be any suitable input and can include any suitable hardware, such as a flange, a vale, etc. For example, as described above in connection with FIGS. 1A to 1J, pressure input 504 can be implemented by the inlet 126. In some embodiments, the pressure transducer 506 can be a transducer that can measures pressures of any suitable range of magnitudes. For example, the pressure transducer 506 can be configured to measure pressures from 0 psi to 100 psi, 0 psi to 150 psi, 0 psi to 300 psi, etc. Additionally, in some embodiments, the pressure transducer 506 can be configured to measure pressures below 0 psi (e.g., created by negative pressure in the plumbing system for which pressure is being measured), or starting from above 0 psi. In some embodiments, the pressure transducer 506 can generate a variable current and/or variable voltage indicative of the measured pressure. For example, the pressure transducer 506 can provide a current between 4 milliamperes (mA) and 20 mA based on the pressure measured at the pressure input 504. As another example, the pressure transducer 506 can provide a voltage between 0 volts (V) and 5 V based on the pressure measured at the pressure input 504. In some embodiments, the value output by the pressure transducer 506 can be mapped to pressure using a linear relationship to the range of pressures which the pressure transducer 506 is configured to measure. For example, if the pressure transducer 506 is configured to measure pressures from 0 psi to 100 psi, and output current between 4 mA and 20 mA or between 0 V and 5 V, the pressure measured by the pressure transducer 506 can be calculated based on an even subdivision of the range into 100, 1,000, 10,000, etc. Alternatively, in some embodiments, the value output by the pressure transducer 506 can be mapped to pressure using a non-linear relationship to the range of pressures which the pressure transducer 506 is configured to measure. For example, if the pressure transducer 506 is configured to measure pressures from 0 psi to 100 psi, and output current between 4 mA and 20 mA or between 0 V and 5 V, the pressure measured by the pressure transducer 506 can be calculated based on a logarithmic scale, an exponential scale, etc.

In some embodiments, a signal output from the pressure transducer 506 can be provided as an input to a microcontroller 512. As described above in connection with microcontroller 114 of FIGS. 1A to 1J, 2 and 3, in some embodiments, the pressure switch 500 can be implemented with a microcontroller that is configured to act as a wireless gateway module. For example, microcontroller 512 can be implemented using a single-chip wireless microcontroller, such as the CC3200MOD microcontroller available from Texas Instruments® (of Dallas, Tex.), which can include a CC3200R1M2RGC microcontroller from Texas Instruments®. In some embodiments, pressure switch 500 can include one or more antennas 520 that is configured to send and/or receive wireless signals, such as signals for communicating over Wi-Fi, Bluetooth, ZigBee, Z-Wave, etc. In some such embodiments, the antenna(s) 520 can receive signals from the wireless gateway module, and can transmit the signals into the surrounding environment. In some embodiments, the antenna(s) 520 can be an integral part of the microcontroller 512 and/or within the wireless gateway. Alternatively, in some embodiments, the antenna 520(s) can be mounted to a PCB and electrically connected to the microcontroller 512 and/or the wireless gateway, and/or can be mounted to the housing of the pressure switch 500 and electrically connected to the microcontroller 512 and/or the wireless gateway. In some embodiments, the pressure switch 500 can communicate with an internet enabled device 502 using the antenna(s) 520. For example, the pressure switch 500 can use the antenna(s) 520 to communicate with the internet enabled device 502 locally using a direct connection (e.g., over a Bluetooth connection, over a direct Wi-Fi connection such as an ad hoc Wi-Fi connection or Direct Wi-Fi connection), and/or an indirect connection (e.g., over a LAN, over a mesh network, etc.). As another example, the pressure switch 500 can use the antenna(s) 520 to communicate with the internet enabled device 502 remotely (e.g., over the Internet via a LAN, a mesh network, etc.). Note that although pressure switch 500 is described as including the microcontroller 512, this is merely an example, and any suitable type of hardware processor or combination of hardware processors can be used to monitor and/or control the pressure switch 100.

In some embodiments, the pressure switch 500 can include a temperature sensor 508 that can output a signal indicative of the temperature of the pressure switch 500, the pump 516, and/or the ambient temperature of the surrounding environment. For example, temperature sensor 508 can be used to monitor whether the pump is potentially overheating. As another example, temperature sensor 508 can be used to monitor whether water in the plumbing system may be in danger of freezing.

In some embodiments, the pressure switch 500 can include a current transformer 510, which can be used to monitor current being drawn by the pump 516. For example, the microprocessor 510 can receive a signal from the current transformer 510, and based on the magnitude of the current output by the transformer can calculate the current being drawn by the pump 516. In such an example, the current transformer 510 can be used to determine whether an overcurrent condition has occurred, whether the pump is not drawing the amount of current expected (e.g., which may indicate a low water level or a problem with the pump), the amount of power being used by the pump, etc.

In some embodiments, the pressure switch 500 can include a relay 514 that can selectively provide power for operation of a pump 516 to which the pressure switch 500 is connected. For example, the relay 500 can be connected to both a source of power (e.g., a household electrical grid) and wires and/or a cable connected to the pump 516, and based on a signal from the microcontroller 512, can either provide power to the pump or inhibit power from being provided to the pump 516.

In some embodiments, the pressure switch 500 can include a power supply 518 that can provide power for operation of the microcontroller 512 and/or any other suitable low voltage devices within the pressure switch 500. For example, as described below, the pressure switch 500 can receive input power at 230 V and 60 Hertz (Hz), which is not suitable for operation of the microcontroller 512, which is typically a low voltage device (e.g., operating at 3.3 V DC, 5 V DC, 12 V DC, 24 V DC, etc.). In some embodiments, power supply 518 can receive AC power (e.g., at 230 V, 60 Hz), convert the AC power to low voltage DC power, and distribute power to one or more other components of the pressure switch 500, such as the microcontroller 512 (via the transformer 510), and the relay 514.

In some embodiments, the pump 516 can be any suitable pump. For example, the pump 516 can be a single phase, 230 V, 15 A pump. However, this is merely an example, and a variety of pumps can be used with the pressure switch 500.

In some embodiments the microcontroller 512 can coordinate operation of the pressure switch 500, such as by controlling the relay 514 to selectively provide power to the pump 516 based on an output of the pressure transducer 508 and/or the temperature sensor 508. Additionally or alternatively, in some embodiments, the microcontroller 512 can monitor operation of the pressure switch, for example, to determine whether a fault has occurred, such as a loss of power to the power supply 518, a loss of water pressure below a particular value (e.g., below 5 psi, to 0 psi, below 0 psi, etc.). In some embodiments, microcontroller 512 can periodically (at regular and/or irregular intervals) provide information to cloud based server 204. For example, microcontroller 512 can monitor operation of the pressure switch 500 and provide information related to its operation to the cloud based server 204 every minute, every five minutes, every 15 minutes, every 30 minutes, every hour, every 12 hours, once per day, etc. As another example, microcontroller 512 can monitor operation of the pressure switch 500 and provide information related to its operation to the cloud based server 204 when a particular condition is met, such as when pressure falls below a particular threshold, when pressure rises above a particular threshold, when temperature falls below a particular threshold, when temperature rises above a particular threshold, when current through the relay 514 falls below a particular threshold, when current through the relay 514 rises above a particular threshold, when voltage of the signal received at the power supply 518 falls below a particular threshold, when voltage of the signal received at the power supply 518 rises above a particular threshold, etc. In such an example, the pressure switch 500 and provide information related to its operation to the cloud based server 204 when the condition is detected, when the condition has persisted for a particular length of time (e.g., one second, five seconds, one minute, etc.), or at any other suitable time. As yet another example, microcontroller 512 can monitor operation of the pressure switch 500 and provide information related to its operation to the cloud based server 204 in response to a request from the cloud based server 204. In such an example, a user interacting with cloud based server 204 can request status information related to operation of the pressure switch 500, and the cloud based server 204 can request the information from the pressure switch 500.

In some embodiments, the microcontroller 512 can use one or more criteria to reduce the likelihood that the pump will be damaged due to short cycling in which the pump is cycled between on and off relatively quickly. For example, the microcontroller 512 can keep the pump 516 running for a minimum amount of time when it is turned on regardless of whether the cut-out pressure has been reached. As another example, the microcontroller 512 can keep the pump 516 off for a minimum amount of time after it has interrupted power to the pump regardless of whether the cut-in pressure has been reached. As yet another example, the microcontroller 512 can limit the number of times the pump 516 is cycled between on and off in a particular time period (e.g., every hour).

In some embodiments, the pressure switch 500 can include any suitable memory (not shown), which can include any suitable storage device or devices that can be used to store instructions, values, etc., that can be used, for example, by a hardware processor (e.g., microcontroller 512) to control operation of the relay 514, to monitor operation of the pressure switch 500, to communicate information to the cloud based server 204, etc. For example, memory can include any suitable volatile memory, non-volatile memory, storage, or any suitable combination thereof. For example, the memory can include RAM, ROM, EEPROM, one or more flash drives, one or more hard disks, one or more solid state drives, one or more optical drives, etc. In some embodiments, the memory can have encoded thereon a computer program for controlling operation of a hardware processor (e.g., microcontroller 512) in the form of computer executable instructions that, when executed by the hardware processor, cause the hardware processor to perform one or more actions as indicated by the instructions. For example, in some such embodiments, the microcontroller 512 can execute at least a portion of the computer program to control operation of the relay 514 based on signals received from the pressure transducer 506, to monitor operation of the pressure switch 500, to transmit information to the cloud based server 204, etc. In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as RAM, Flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any other suitable media that is fleeting and devoid of any semblance of permanence during transmission, and/or any suitable intangible media.

In some embodiments, the pressure switch 500 can include energy storage (not shown), such as a battery, an ultracapacitor, a fuel cell, etc. In some embodiments, the microcontroller 500 can use power from the energy storage to continue to operate (e.g., to send information related to the status of the pressure switch 500) when power to power supply 518 is interrupted.

Figure 6:
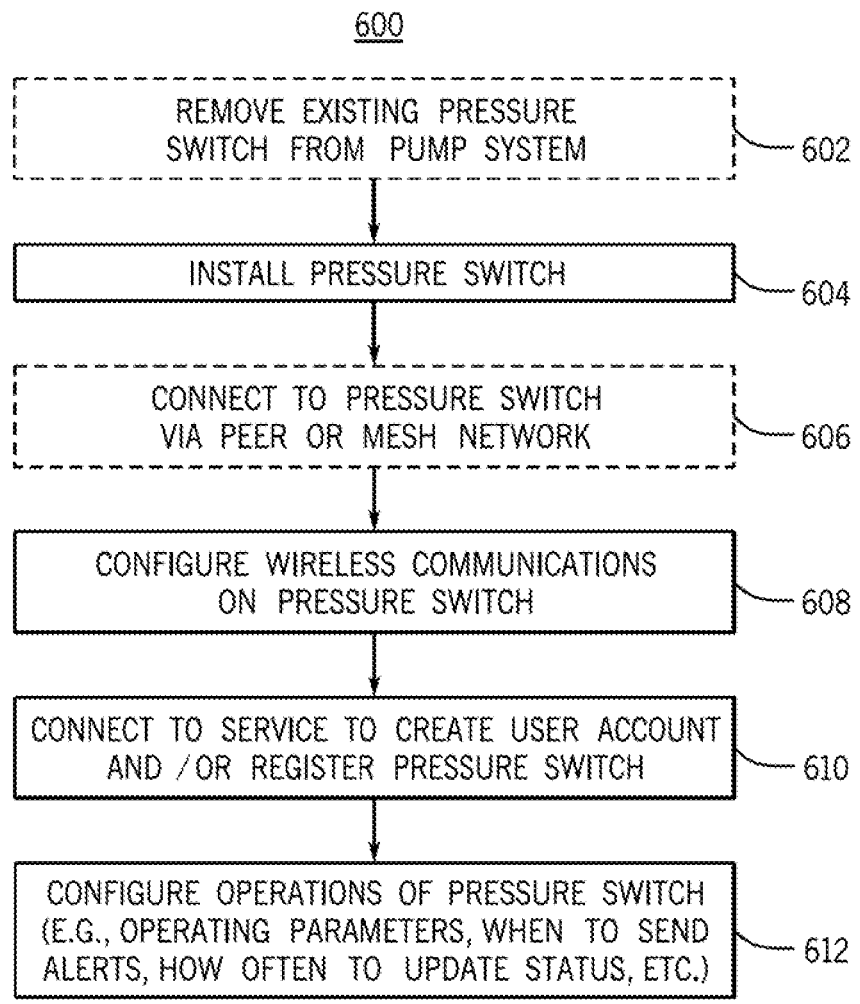
FIG. 6 is an example of a process for configuring a pressure switch in accordance with some embodiments of the present disclosure.

FIG. 6 shows an example 600 of a process for configuring a pressure switch in accordance with some embodiments of the present disclosure. As shown in FIG. 6, process 600 can begin at 602, by optionally removing an existing (e.g., legacy) pressure switch that is being used to control operation of a pump. For example, if a homeowner is retrofitting an existing pump system, a qualified person (who may or may not be the homeowner) can, at 602, remove the existing pressure switch (e.g., a legacy pressure switch) from the pump system. In some embodiments, removing the existing pressure switch can involve any suitable steps performed in any suitable order, such as interrupting power to the existing pressure switch, disconnecting wires and/or a cable providing power to the existing pressure switch, disconnecting wires and/or a cable providing power to the pump from the existing pressure switch, disconnecting a pressure input to the existing pressure switch, and/or disconnecting a physical connector securing the existing pressure switch to the pump system.

At 604, process 600 can include installing a pressure switch implemented in accordance with some embodiments of the present disclosure. For example, process 600 can include installing the pressure switch 100 or the pressure switch 500. In some embodiments, In some embodiments, installing the pressure switch can involve any suitable steps performed in any suitable order, such as, securing the pressure switch to the pump system, connecting a pressure input to the pressure switch, connecting wires and/or a cable to provide power to the pump from the pressure switch, connecting wires and/or a cable to provide power to the existing switch (e.g., from the residential electric system), and/or providing power to the pressure switch (e.g., by closing a circuit interrupted when disconnecting the existing power switch).

At 606, process 600 can optionally include connecting an internet enabled device (e.g., internet enabled device 206) to the pressure switch via a peer network connection (e.g., Bluetooth, ZigBee, Z-Wave, a direct/peer-to-peer Wi-Fi connection with the pressure switch acting as a node in an ad hoc Wi-Fi network or a Wi-Fi Direct connection, etc.), or through a mesh wireless connection (e.g., ZigBee, Z-Wave, etc.). For example, in some embodiments, a user can cause the internet enabled device to search for Bluetooth connections, and can select an available device that corresponds to the pressure switch. As another example, the pressure switch, when initially powered on (e.g., from an off state), can establish itself as a node in a peer-to-peer Wi-Fi network (e.g., an ad hoc Wi-Fi network or a Wi-Fi Direct connection) that accepts appropriate connection requests, and the pressure switch may be configured to broadcast a particular service set identifier (SSID) and/or require a particular password that are preconfigured (e.g., from an EEPROM). The user can select the appropriate SSID and enter a password to connect directly to the pressure switch over a Wi-Fi connection. In such an example, the preconfigured SSID and password may be included in a label applied to the pressure switch, on packaging in which the pressure switch was packaged, in literature accompanying the pressure switch, and/or can be communicated using any other suitable technique. In such an example, the pressure switch can act as a node in a wireless ad-hoc network until it establishes a Wi-Fi connection with a wireless access point (e.g., a router), or until a particular period of time has elapsed (e.g., 15 minutes, 30 minutes, etc.). Additionally, in such an example, the pressure switch can have a user input (e.g., a hardware button or switch) that, when activated, causes the pressure switch to act as a discoverable node in a peer-to-peer Wi-Fi network. As yet another example, the pressure switch can be configured to accept new connections as part of a mesh network, such as a ZigBee network, a Z-Wave network, an EnOcean network, etc., and the user can utilize an application installed on the internet enabled device to add the pressure switch to an existing mesh network (e.g., including a hub), or to establish a connection directly with the pressure switch.

In some embodiments, prior to establishing the connection, the user can (or may be required to) download an application that can be used to configure the pressure switch. For example, a manufacturer, distributor, seller, and/or service provider associated with the pressure switch can provide an application that can be used to configure the pressure switch. As another example, a third party provide an application that can be used to configure the pressure switch (e.g., a provider of an application and/or system for managing connected devices). Additionally or alternatively, prior to establishing the connection, the user can (or may be required to) visit a particular web page that can be used to configure the pressure switch. Such a web page can be a web page manufacturer, distributor, seller, and/or service provider associated with the pressure switch. Additionally or alternatively, the web page can be a web page that is associated with the pressure switch that is to be configured (e.g., the web address can be uniquely identified with the particular pressure switch). In some embodiments, when a connection is established with the pressure switch, the pressure switch can prompt the user to download an appropriate application, or visit a particular web page, for configuring the pressure switch.

In some embodiments, the pressure switch can be configured without requiring the user to establish a local connection to the pressure switch (i.e., 606 can be omitted in come embodiments). For example, if the pressure switch is implemented with a cellular modem, the user can download and application and/or visit a web page to configure the pressure switch, and can information can be provided to the pressure switch using a connection established by the cellular modem.

At 608, process 600 can include setting up a wireless connection (e.g., a Wi-Fi connection, a cellular connection, a ZigBee connection, a Z-wave connection, a Bluetooth connection, etc.) that the pressure switch can use to provide information related to the operation of the pressure switch to the cloud based server 204.

At 610, process 600 can include establishing a connection between an internet enabled device (e.g., internet enabled device 206) and a service provided by the manufacturer, distributor, seller, or service provider associated with the pressure switch, or by a third party. For example, the service can be provided by the cloud based server 204, which can register a user account, associate a pressure switch with the user account, collect information from pressure switches associated with the user account, provide information and/or alerts to the user associated with the user account, receive instructions from the user through the service, send instructions to a pressure switch, send information to someone authorized by the user (e.g., a technician such as a plumber, the manufacturer, distributor, seller, and/or service provider associated with the pressure switch, etc.).

In some embodiments, the internet enabled device can download, install, and/or execute an application that can be used to configure the pressure switch, and can create a user account within the application, or the internet enabled device can be directed by the application to load a web page that can be used to create a user account. Additionally or alternatively, in some embodiments, the internet enabled device can load a web page that can be used to configure the pressure switch, and/or can be used to create a user account. In some embodiments, a user can register the pressure switch (e.g., through an application and/or web page), and can create a user account when registering the pressure switch. In some embodiments, a user can register multiple residential devices with a given user account, which may include devices other than pressure switches. In some embodiment, a user can access information stored in the cloud based server 204 by logging in to the user account. In some embodiments, a user account can be associated with any suitable information. For example, the user account can be associated with information about the user, such as contact information (e.g., address information, one or more e-mail addresses, one or more phone numbers, etc.). As another example, the user account can be associated with information (e.g., a list) identifying devices associated with the user account. As yet another example, the user account can be associated with maintenance information. In a particular example, the user account can be associated with information about the pump, the water source (e.g., well), and/or the pressure sensor, such as a pump size, a pump type, a pump setting, a casing depth, a well depth, a check valve location, a drawdown, etc., which may assist a technician if maintenance is required.

In some embodiments, the user can register the pressure switch by providing information about the pressure switch, such as such as a model number(s), a serial number(s), information about where the pressure switch was purchased (an online retailer, a distributor, a big box store, after market, etc.), installer information, etc.

In some embodiments, information provided when registering a pressure switch can be used to provide analytic information to a manufacturer, distributor, seller, and/or service provider associated with the pressure switch. For example, the provided information can be accessed by customer support personnel, facilitating faster and/or more accurate diagnosis of a given problem, dispatch of replacement parts, and/or dispatch of service personnel.

In some embodiments, a user can adjust settings associated with the user account to indicate whether the remote server (and/or the pressure sensor) are permitted to make automated service calls, or to automatically order replacement parts. For example, if the pressure sensor determines that a particular type of fault has likely occurred, the remote server can automatically request maintenance and/or order replacement parts necessary to perform the maintenance.

At 612, process 600 can include configuring the pressure switch for operation. For example, through an application and/or web page user interface accessed through the internet enabled device, the user can configure operations of the pressure switch by sending instructions and/or commands to the pressure switch. In a more particular example, the user can configure one or more operating parameters, such as a cut-in pressure, a cut-out pressure, whether to shut down the pump if pressure falls below a particular high pressure threshold, the low pressure threshold, operating temperature range, etc.

As another more particular example, the user can configure when to send alerts to the user, how to send such alerts (e.g., by email, text message, push notification, etc.), a maximum number of alerts to send with a particular period of time (e.g., one every twenty four hours), for which conditions to send alerts to the user, etc.

As yet another more particular example, the user can configure how often the pressure switch sends updated status information to the server during normal operation (e.g., every minute, every five minutes, once per hour, once per day, etc.), and/or how many data points to send when updating the status information (e.g., whether each measurement is sent, whether average values are sent, etc.).

In some embodiments, at least a portion of process 600 can be executed by one or more hardware processors of the pressure switch (e.g., microprocessor 114 and/or microprocessor 512), while one or more other portions can be performed by a remote server (e.g., cloud based server 204) and/or by an internet enabled device (e.g., internet enabled device 206, internet enabled device 400, internet enabled device 402, internet enabled device 502). Additionally, in some embodiments, one or more portions of process 600 can be carried out by a homeowner, technician, or other person.

Figure 7:
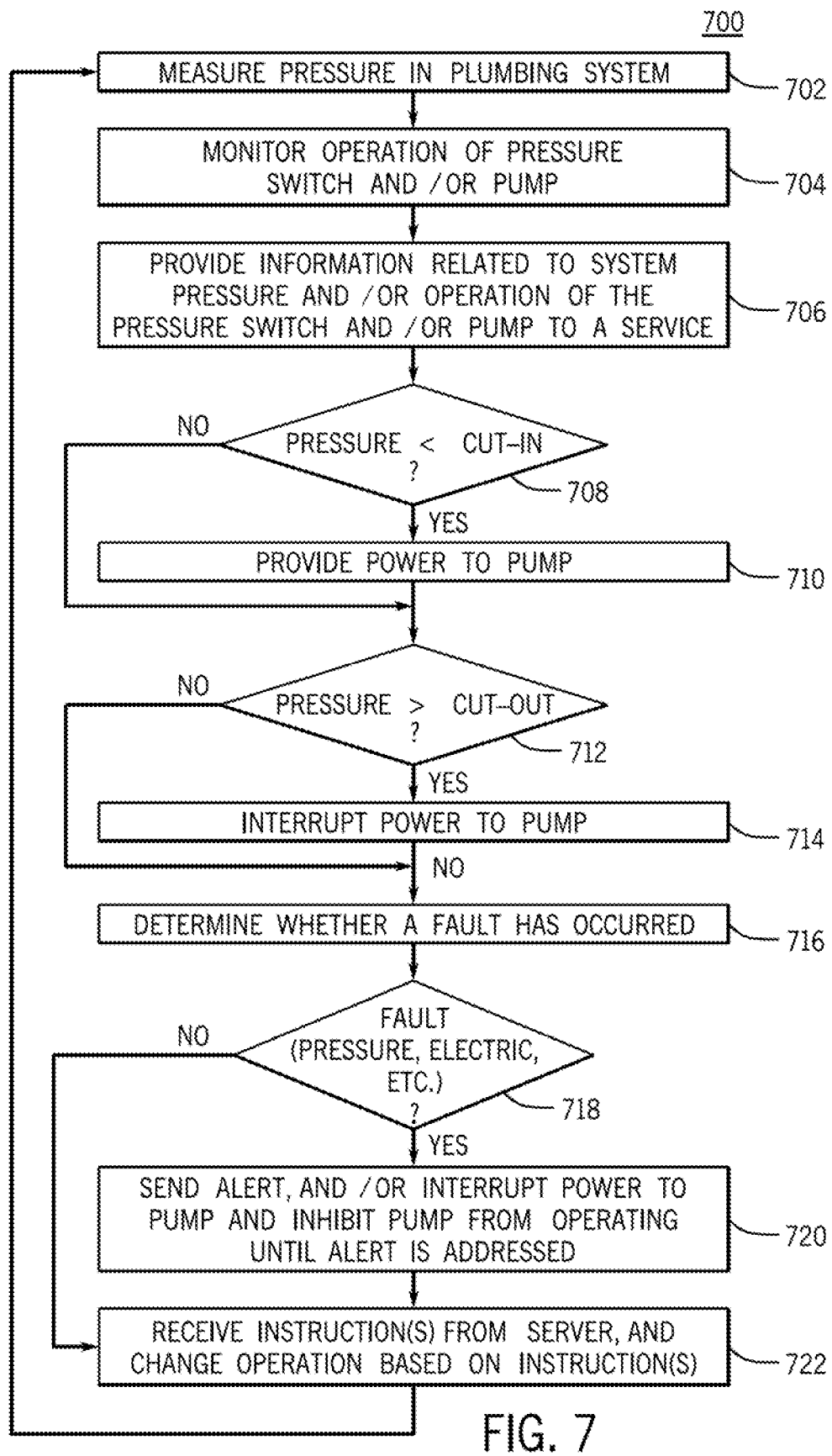
FIG. 7 is an example of a process for controlling operation of a pump in accordance with some embodiments of the present disclosure.

FIG. 7 shows an example 700 of a process for controlling operation of a pump in accordance with some embodiments of the present disclosure. As shown in FIG. 7, at 702, process 700 can measure pressure in a plumbing system that includes a pump (e.g., pump 516) to be controlled by a pressure switch (e.g., pressure switch 100 and/or pressure switch 500). In some embodiments, process 700 can measure the pressure using any suitable technique or combination of techniques. For example, process 700 can measure the value of a signal from a pressure transducer (e.g., pressure transducer 506) that is in fluid communication with the plumbing system.

At 704, process 700 can monitor operation of the pressure switch and/or the pump which the pressure switch is to control. For example, process 700 can monitor the ambient temperature in the vicinity of the pressure switch, the current being drawn by the pump when the pump is being provided with power (e.g., to detect an overcurrent condition), cycling of the pump, etc.

At 706, process 700 can provide information related to the measured pressure, and/or operation of the pressure switch and/or pump to a service. For example, in some embodiments, process 700 can provide the information to a cloud based server. In some embodiments, process 700 can provide such information periodically (e.g., at regular and/or irregular intervals). For example, process 700 can provide the information every minute, every five minutes, every 15 minutes, every 30 minutes, every hour, every 12 hours, once per day, etc. As another example, process 700 can provide the information when a particular condition is met. As yet another example, process 700 can provide the in response to a request (e.g., from the cloud based server 204).

If process 700 determines, at 708, that the measured pressure is less than a cut-in pressure ("YES" at 708), process 700 can move to 710 and can provide power to the pump to cause the pump to run, increasing the water pressure in the plumbing system. Otherwise, if process 700 determines that the measured pressure is equal to, or greater than the cut-in pressure ("NO" at 708), process 700 can move to 712. Note that process 700 can instead determine whether the measured pressure is less than or equal to the cut-in pressure when determining whether to provide power to the pump.

If process 700 determines, at 712, that the measured pressure is greater than a cut-out pressure ("YES" at 712), process 700 can move to 714 and can interrupt power to the pump to inhibit the pump from running, which may cause the water pressure in the plumbing system to fall. Otherwise, if process 700 determines that the measured pressure is equal to, or less than, than the cut-out pressure ("NO" at 712), process 700 can move to 716. Note that process 700 can instead determine whether the measured pressure is greater than or equal to the cut-in pressure when determining whether to interrupt power to the pump.

At 716, process 700 can determine whether a fault has occurred. In some embodiments, process 700 can determine whether a fault has occurred based on the measured pressure and/or the operation of the pressure switch and/or pump. For example, if the measured pressure is below a minimum pressure (or, alternatively, at or below the threshold), process 700 can determine that a fault has occurred. In such an example, the measure pressure may indicate that there is likely not enough water being provided from the well (or other water source) for the pump to safely operate. As another example, if process 700 provided power to the pump, but the measure pressure does not increase, process 700 can determine that a fault has occurred. In such an example, if the pump is being provided with power (e.g., the relay has been instructed to close), but water pressure is not increasing it may indicate that there is a problem with the pump, with the relay, with the wires connecting the pump to the relay, etc. As still another example, if the current being drawn by the pump is outside of a normal operating range, process 700 can determine that a fault has occurred. In such an example, if the current is below the normal operating range it may indicate that the pump is not operating correctly, whereas if the is above the normal operating range it may also indicate that the pump is not operating correctly. As a further example, if the voltage or frequency of the input power fluctuates more than a predetermined amount, process 700 can determine that a fault has occurred. In such an example, providing a power signal outside a normal operating range may risk damaging the pump and/or the pressure switch. As another further example, if a parameter monitored at 704 falls outside of a range set by a user, process 700 can determine that a fault has occurred. In such an example, a user can set ranges for various parameters such that if the value of the parameter falls outside of the range, the pump can be shut down and/or the user can be alerted.

If process 700 determines, at 718, that a fault has occurred ("YES" at 718), process 700 can move to 720. At 720, process 700 can cause an alert to be sent to a user or other party associated with the user account (e.g., a service provider). Additionally or alternatively, at 720, process 700 can interrupt power to the pump (if power is currently being provided to the pump), and can inhibit the pump from operating unless and until the alert or fault is addressed.

In some embodiments, process 700 can cause any type of alert to be provided to the user. For example, in some embodiments, process 700 can send information indicating that an alert be sent to the user to a server (e.g., the cloud based server 204) and/or the information to be sent with the alert, and the cloud based server can determine how to deliver the alert based on user preferences. In a more particular example, the server can determine whether to send an email, send a text message, send a push notification (e.g., to an instance of an application associated with the user, such as an instance of the application installed on an internet enabled device associated with the user and/or an instance of the application which the user used to sign in to the user account), make a phone call, etc. In such a more particular example, the server can compose the alert and send it using one or more communication channels preferred by the user. In some embodiments, process 700 can cause the alert to be sent by the server by simply providing information indicating that a fault has occurred, and the server can generate the alert. Additionally or alternatively, in some embodiments, the server can receive information from the pressure switch (e.g., related to the measured pressure and/or operation of the pressure switch and/or pump), and the server can determine whether a fault has occurred based on the received information (i.e., the server can execute at least a portion of process 700, while one or more other portions are executed by the pressure switch).

As another example, process 700 can generate and send an alert to the user based on user preferences. In a more particular example, process 700 can determine whether to send an email, send a text message, send a push notification (e.g., by sending a request to a push notification server), make a phone call, etc., and can send the alert to the user. In such an example, a pressure switch executing process 700 can send the alert using the wireless gateway module 116 via a local area network, via a cellular network, etc.

At 722, process 700 can receive one or more instructions or commands from a server and/or an internet enabled device, and can change operation of the pressure switch and/or pump based on the received one or more instructions. For example, if a fault has occurred, a user can access a user interface provided by a service provider (e.g., via a web page loaded by the internet enabled device 204, an application being executed by the internet enabled device 204, via a virtual personal assistant, via an application program interface (API), etc.), and can select one or more instructions to be carried out. In a more particular example, the user can instruct the pressure switch to reset, to turn off the pump, to turn on the pump, to clear an alert, to clear a fault, to change a cut-in or cut-out pressure, etc. In some embodiments, instructions can be sent from an internet enabled device to the pressure switch without being sent first to the cloud based server (although the instructions may pass through one or more servers while being routed from the internet enabled device to the pressure switch).

In some embodiments, at least a portion of process 700 can be executed by one or more hardware processors of the pressure switch (e.g., microprocessor 114 and/or microprocessor 512), while one or more other portions can be performed by a remote server (e.g., cloud based server 204) and/or by an internet e'nabled device (e.g., internet enabled device 206, internet enabled device 400, internet enabled device 402, internet enabled device 502).

In some embodiments, certain faults (or all faults) must be addressed by the homeowner or another user (e.g., a technician) that is physically present at the pressure switch. For example, if an electrical problem may have occurred, or if the pump may be inoperable, the homeowner or a technician may be required to be present to investigate the fault before power can be provided to the pump.

Although the present disclosure is generally directed to a pressure switch used in connection with a pump system used to maintain water pressure in a home that is supplied by well water, this is merely for illustrative purposes, and the pressure switch can be used in other contexts, such as in connection with systems for maintaining adequate water pressure in upper floors of a high rise apartment or office building, for controlling a gas compressor based on pressure in a reservoir, and for use in other systems. Additionally, although the disclosure is generally directed to a pressure switch, one or more aspects of the present disclosure can be in other types of devices that relate to pump control.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

The invention claimed is:

1. A system for monitoring operation of a water pump coupled to plumbing, the system comprising:
    a pressure switch, comprising:
        a printed circuit board, the printed circuit board positioned within a housing;
        a power supply in electrical communication with one or more components coupled to the printed circuit board, wherein the power supply is configured to receive electric power from one or more electric power inputs;
        a wireless gateway module coupled to the printed circuit board, wherein the wireless gateway module is configured to establish a first wireless connection to a first wireless network, and transmit a message to a remote server over the first wireless network;
        a pressure sensor;
        a microcontroller coupled to the wireless gateway module, the printed circuit board, the power supply, and the pressure sensor, wherein the microcontroller is configured to execute computer readable instructions, wherein execution of the computer readable instructions cause the microcontroller to:
            establish a second wireless connection to communicate with an internet enabled device over a second wireless network;
            receive one or more instructions from the internet enabled device over the second wireless connection;
            configure the pressure switch to connect to the first wireless network based on the one or more instructions;
            receive a signal from the pressure sensor indicative of pressure in at least a portion of the plumbing;
            determine the pressure in at least the portion of the plumbing based on the signal from the pressure sensor;
            control operation of the water pump based on the pressure;
            determine that a fault has occurred in the system;
            in response to determining that the fault has occurred in the system, automatically inhibiting operation of the pump without user intervention;
            generate the message, wherein the message includes information related to the fault;
            establish a connection to the first wireless network; and
            send the message to the remote server via the first wireless network; and
    the remote server, wherein the remote server is configured to:
        receive the message;
        store the received message in a file structure associated with the pressure switch;
        receive a request from the internet enabled device to access information related to the fault; and
        send the information related to the fault to the internet enabled device.

2. The system of claim 1, wherein the pressure switch is mounted to the pump.

3. The system of claim 1, wherein the pressure switch is configured to receive a signal indicative of a motor current of the pump.

4. The system of claim 3, wherein execution of the computer readable instructions further cause the microcontroller to:
    determine that a first fault occurred based on the motor current; and
    determine that a second fault occurred based on the signal output from the pressure sensor.

5. The system of claim 1, wherein the housing comprises a base and a cover, the cover comprising at least one through-hole and the base comprising at least one recess.

6. The system of claim 5, wherein the cover is configured to be securely coupled to the base by a coupling element passing through the at least one through hole and into the at least one recess.

7. The system of claim 1, wherein the pressure switch further comprises a relay electrically connected between the one or more electric power inputs and the water pump, and wherein execution of the computer readable instructions further cause the microcontroller to:
    cause the relay to complete a circuit between the one or more electric power inputs and the water pump in response to pressure in at least the portion of the plumbing being less than a cut-in pressure; and
    cause the relay to interrupt the circuit between the one or more electric power inputs and the water pump in response to pressure in at least the portion of the plumbing being greater than a cut-out pressure.

8. The system of claim 1, wherein the pressure sensor is a pressure transducer.

9. The system of claim 1, wherein the internet enabled device is a mobile computing device.

10. The system of claim 1, wherein the power supply is a switched-mode power supply.

11. The system of claim 1, wherein the wireless gateway module is configured to communicate directly with the internet enabled device.

12. The system of claim 11, wherein the second wireless connection is a Wi-Fi connection, and wherein execution of the computer readable instructions further cause the microcontroller to:
    configure the wireless gateway module to function as a discoverable node for a peer-to-peer Wi-Fi connection for a predetermined time in response to the microcontroller transitioning from an off state to an on state;
    receive a request to connect to the node from the internet enabled device; and
    in response to the request to connect to the node, establish the second wireless connection with the internet enabled device.

13. The system of claim 12, wherein the first wireless connection is a Wi-Fi connection, and wherein the wireless gateway module is configured to communicate with a wireless access point in a local area network (LAN) to establish the first wireless connection.

14. The system of claim 13, wherein execution of the computer readable instructions further cause the microcontroller to:
receive the one or more instructions from an application executed by the internet enabled device over the second wireless connection, wherein the one or more instructions includes an instruction indicating a service set identifier (SSID) associated with the wireless access point in the LAN; and
configure the pressure switch to connect to the first wireless network based on the SSID.

15. The system of claim 1, wherein execution of the computer readable instructions further cause the microcontroller to receive a command corresponding to a selection made via a user interface presented by the internet enabled device.

16. The system of claim 15, wherein the command includes at least one instruction to cause the pressure switch to change at least one of a plurality of device settings.

17. The system of claim 16, wherein the wireless gateway module is configured to receive the command over the first wireless connection.

18. The system of claim 17, wherein execution of the computer readable instructions further causes the microcontroller to change the at least one of the plurality of device settings based on the command.

19. The system of claim 1, wherein the remote server is a cloud-based server.

20. The system of claim 1, wherein execution of the computer readable instructions further cause the microcontroller to:
generate a second message, wherein the second message includes information related to a status of the system; and
send the second message to the remote server via the first wireless network.

21. The system of claim 1, wherein execution of the computer readable instructions further causes the microcontroller to:
generate a second message, wherein the second message includes information related to a change in a status of the system; and
send the second message to the remote server via the first wireless network.

22. The system of claim 1, wherein execution of the computer readable instructions further causes the microcontroller to:
generate a second message, wherein the second message includes information indicating that the system requires maintenance; and
send the second message to the remote server via the first wireless network.

23. The system of claim 1, wherein execution of the computer readable instructions further causes the microcontroller to:
generate a second message, wherein the second message includes a request for maintenance; and
send the second message to the remote server via the first wireless network.

24. The system of claim 23, wherein the remote server is further configured to send a request for maintenance based on the second message to a service provider automatically without user intervention in response to receiving the second message.

25. The system of claim 1, wherein execution of the computer readable instructions further causes the microcontroller to:
generate a second message, wherein the second message includes a request for replacement parts; and
send the second message to the remote server via the first wireless network.

26. The system of claim 25, wherein the remote server is further configured to send a request for replacement parts to a parts supplier automatically without user intervention in response to receiving the second message.

27. The system of claim 25, wherein the remote server is further configured to send payment information with the request for replacement parts.

28. The system of claim 1, wherein the second wireless connection is a cellular connection, and the wireless gateway module is further configured to communicate with the remote server using the cellular connection.

29. The system of claim 1, wherein the pressure switch further comprises a temperature sensor, and wherein the message includes information related to an ambient temperature in the vicinity of the pressure switch based on an output of the temperature sensor.

30. The system of claim 1, wherein the fault corresponds to a low water condition, and wherein execution of the computer readable instructions further causes the microcontroller to interrupt power to the water pump in response to the fault.

31. The system of claim 1, wherein execution of the computer readable instructions further causes the microcontroller to implement a short cycle protection delay.

32. The system of claim 1, wherein the fault corresponds to an overcurrent condition, and wherein execution of the computer readable instructions further causes the microcontroller to interrupt power to the water pump in response to the fault.

33. The system of claim 1, wherein the fault corresponds to an overpressure condition, wherein execution of the computer readable instructions further causes the microcontroller to interrupt power to the water pump in response to the fault.

34. The system of claim 1, wherein the remote server is further configured to store up to 50 occurrences of fault conditions.

35. The system of claim 1, wherein the remote server is further configured to store an installation record for the pressure switch, the installation record comprising at least one of a pump size, a pump type, a pump setting, a casing depth, a well depth, a check valve location, a drawdown, and a pressure switch serial number.

36. The system of claim 1, wherein the microcontroller, the wireless gateway module, the printed circuit board, the power supply, and the pressure sensor are each disposed within the housing,
the housing further comprising an inlet configured to be mechanically coupled to a component of the plumbing such that the pressure sensor is in fluid communication with the plumbing.

37. A method for controlling and monitoring a water pump coupled to plumbing, the method comprising:
disconnecting a first pressure switch from the water pump and the plumbing;

connecting a second pressure switch to the water pump and the plumbing, wherein the second pressure switch comprises:
    a printed circuit board, the printed circuit board positioned within a housing;
    a power supply in electrical communication with one or more components coupled to the printed circuit board;
    a wireless gateway module coupled to the printed circuit board, wherein the wireless gateway module is configured to establish a wireless connection to a first wireless network, and transmit a message to a remote server over the first wireless network;
    a pressure sensor;
    a microcontroller coupled to the wireless gateway module, the printed circuit board, the power supply, and the pressure sensor;
establishing, using an internet enabled device, a second wireless connection to communicate with the second pressure switch over a second wireless network;
causing the internet enabled device to send one or more instructions that cause the second pressure switch to connect to the first wireless network; and
receiving, using the internet enabled device, a message from a remote server, wherein the message includes information related to a fault that occurred in at least one of the second pressure switch or the water pump, and information indicating that further operation of the water pump is inhibited until the fault is addressed.

38. A device for monitoring operation of a water pump configured to increase the water pressure in plumbing associated with a structure, and communicating with a remote server that is configured to receive a message from the device, store the message in a file structure associated with a pressure switch, receive a request from a computing device to access information related to the water pump, and send information related to the water pump to the computing device, the device comprising:
    a housing configured to be mechanically coupled to a component of the plumbing;
    a power supply positioned within the housing, the power supply configured to be electrically coupled to a power source;
    a wireless gateway module positioned within the housing, the wireless gateway module configured to establish a first wireless connection to a first wireless network, and transmit messages to the remote server over the first wireless network;
    a pressure sensor positioned within the housing; and
    a microcontroller coupled to the power supply, the wireless gateway module, and the pressure sensor, the microcontroller configured to execute computer readable instructions, execution of the computer readable instructions cause the microcontroller to:
    establish a second wireless connection to communicate with an internet enabled device over a second wireless network;
    receive an instruction from the internet enabled device over the second wireless connection;
    configure the device to connect to the first wireless network based on the instruction;
    determine a pressure in at least a portion of the plumbing based on a signal received from the pressure sensor;
    control operation of the water pump based on the pressure;
    generate a first message related to operation of the water pump;
    establish a connection to the first wireless network; and
    send the first message to the remote server via the first wireless network.

39. The device of claim 38, wherein the power supply comprises:
    a first conductor configured to receive power from the power source;
    a second conductor configured to provide power to the water pump; and
    an electrical switch coupled to the first conductor and the second conductor, the electrical switch configured to receive a signal from the microcontroller to switch between a first state in which the switch provides an electrical connection between the power source and the water pump, and a second state in which the switch inhibits the electrical connection between the power source and the water pump.

40. The device of claim 39, wherein execution of the computer readable instructions further causes the microcontroller to:
    determine that a fault occurred;
    in response to determining that the fault occurred, automatically cause the electrical switch to enter the second state;
    inhibit the switch from entering the first state until the fault is addressed;
    generate a second message related to the fault; and
    send the second message to the remote server via the first wireless network.

41. The device of claim 38, wherein the housing comprises an inlet configured to be mechanically coupled to a component of the plumbing such that the pressure sensor is in fluid communication with the plumbing such that the weight of the device is supported entirely by plumbing.

\* \* \* \* \*